United States Patent
Maruta et al.

(10) Patent No.: US 9,208,546 B2
(45) Date of Patent: Dec. 8, 2015

(54) IMAGE PROCESSING APPARATUS, METHOD AND IMAGING APPARATUS

(71) Applicant: SOCIONEXT INC., Yokohama, Kanagawa (JP)

(72) Inventors: Daisuke Maruta, Yokohama (JP); Senshu Igarashi, Kamakura (JP); Yuji Umezu, Yokohama (JP)

(73) Assignee: SOCIONEXT INC., Yokohama (JP)

( * ) Notice: Subject to any disclaimer, the term of this patent is extended or adjusted under 35 U.S.C. 154(b) by 0 days.

(21) Appl. No.: 14/085,480

(22) Filed: Nov. 20, 2013

(65) Prior Publication Data

US 2014/0212032 A1 Jul. 31, 2014

(30) Foreign Application Priority Data

Jan. 30, 2013 (JP) ................. 2013-016104

(51) Int. Cl.
*G06K 9/00* (2006.01)
*G06T 5/20* (2006.01)

(52) U.S. Cl.
CPC ......... *G06T 5/20* (2013.01); *G06T 2207/10004* (2013.01); *G06T 2207/20148* (2013.01)

(58) Field of Classification Search
CPC ........... G06K 9/02; G06K 9/40; H04N 5/211; H04N 5/2256; G06T 5/002; G06T 5/003; G06T 5/005; G06T 5/008; G06T 5/20; G06T 5/50; G06T 7/0081; G06T 11/001; G06T 11/40; G06T 2200/24; G06T 2207/10004; G06T 2207/10008; G06T 2207/10024; G06T 2207/10032; G06T 2207/20148; G06T 2207/20164; G06T 2207/20204; G06T 2207/20216; G06T 2207/20224
See application file for complete search history.

(56) References Cited

U.S. PATENT DOCUMENTS

| | | | |
|---|---|---|---|
| 8,908,062 B2 * | 12/2014 | Ito | 348/223.1 |
| 2005/0063604 A1 | 3/2005 | Kita | |
| 2005/0063606 A1 | 3/2005 | Kita | |

FOREIGN PATENT DOCUMENTS

| | | |
|---|---|---|
| JP | 2003-058880 A | 2/2003 |
| JP | 2003-256832 A | 9/2003 |
| JP | 2005-092724 A | 4/2005 |
| JP | 2005-094617 A | 4/2005 |
| JP | 2011-151454 A | 8/2011 |

* cited by examiner

*Primary Examiner* — Jose Couso
(74) *Attorney, Agent, or Firm* — Arent Fox LLP

(57) ABSTRACT

An image processing apparatus includes an extraction section that extracts a first high brightness region from a source image where brightness is a first threshold value or greater, a mask generation section that performs blur processing and binarization processing on the first high brightness region and generates a mask containing the first high brightness region, a mask application section that based on the mask performs elimination processing, thinning processing, or both on the first high brightness region, a bright line generation section that generates a bright line based on a second high brightness region contained in output of the mask application section, and a synthesizing section that synthesizes the bright line onto the source image.

20 Claims, 25 Drawing Sheets

FIG.3

5 × 5 LINEAR SMOOTHING
FILTER (SIMPLE AVERAGE)

$\frac{1}{25} \times$

| 1 | 1 | 1 | 1 | 1 |
|---|---|---|---|---|
| 1 | 1 | 1 | 1 | 1 |
| 1 | 1 | 1 | 1 | 1 |
| 1 | 1 | 1 | 1 | 1 |
| 1 | 1 | 1 | 1 | 1 |

FIG.4

5 × 5 LINEAR SMOOTHING
FILTER (WEIGHTED AVERAGE)

$\frac{1}{256} \times$

| 1 | 4 | 6 | 4 | 1 |
|---|---|---|---|---|
| 4 | 16 | 24 | 16 | 4 |
| 6 | 24 | 36 | 24 | 6 |
| 4 | 16 | 24 | 16 | 4 |
| 1 | 4 | 6 | 4 | 1 |

IMAGE PROCESSING APPARATUS, METHOD AND IMAGING APPARATUS

CROSS-REFERENCE TO RELATED APPLICATION

This application is based upon and claims the benefit of priority of the prior Japanese Patent Application No. 2013-016104, filed on Jan. 30, 2013, the entire contents of which are incorporated herein by reference.

FIELD

The embodiments discussed herein are related to an image processing apparatus, an image processing method, a recording medium that stores an image processing program, and an imaging apparatus.

BACKGROUND

One type of camera-lens-mounted optical filter is a "cross filter" that produces bright lines in a cross shape at light sources such as illumination points.

Recently, among compact digital cameras not mountable with optical filters, there are also digital camera products that are capable of adding, as a special effect, a cross filter effect. Such cross filter effects are generally executed by image processing.

As methods of image processing to execute a cross filter effect, generally bright line synthesis is performed to high brightness regions of an image, with the following two possible types. A first method is to scan an image and search for high brightness regions, then to synthesize a pre-prepared bright line pattern one at a time onto the high brightness regions that have been found. Another method is to apply blur processing in one direction to an image of high brightness regions extracted from a source image, so as to produce thin, bright line extensions. In such a method, plural bright lines produced by applying blur processing in plural different directions (for example in two directions when producing a cross-shaped cross filter effect) are synthesized onto the source image.

When the bright lines are produced for all the high brightness regions extracted from the source image and synthesized onto the source image, bright lines are added to large surface area high brightness regions, resulting in an unsightly image with a dirty, stained impression. Moreover, when there are plural high brightness regions present at high concentrations, excessive bright lines are added which again results in an unsightly dirty impression.

There is however a method proposed, for example, to select, out of high brightness pixel groups selected from target image data, high brightness pixel groups that form high brightness pixel groups whose size is a specified brightness point permissible pixel size or smaller.

There is also a method proposed in which, when high brightness pixels selected from an image configure plural adjacent groups, a representative pixel is selected from out of the group as a processing target light source, and then a ray pattern is synthesized centered on the processing target light source.

There is also a method proposed in which, within each segment range of segmented image data, a pixel at a position where a presence density of first reference pixels whose brightness values are a first threshold value or higher are present at maximum density is determined as a second reference pixel, and light-streak image data is added to the image data so that the second reference pixel is substantially centered.

There is also a proposal in which a priority is determined based on specified conditions for high brightness regions identified in the input image, and when there are a specified number of the identified high brightness regions or greater, the specified number of high brightness regions are selected in sequence from the highest priority high brightness region, and then an enhanced image with the high brightness regions depicted enhanced is synthesized onto the input image.

RELATED PATENT DOCUMENTS

Japanese Laid-Open Patent Publication No. 2005-92724
Japanese Laid-Open Patent Publication No. 2005-94617
Japanese Laid-Open Patent Publication No. 2003-256832
Japanese Laid-Open Patent Publication No. 2003-58880
Japanese Laid-Open Patent Publication No. 2011-151454

SUMMARY

According to an aspect of the embodiments, an image processing apparatus includes: an extraction section that extracts a first high brightness region from a source image in which brightness is a first threshold value or greater; a mask generation section that performs blur processing and binarization processing on the first high brightness region and generates a mask containing the first high brightness region; a mask application section that, based on the mask, performs at least one of elimination processing or thinning processing on the first high brightness region; a bright line generation section that generates a bright line based on a second high brightness region contained in output of the mask application section; and a synthesizing section that synthesizes the bright line onto the source image.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a schematic diagram illustrating an example of a linear smoothing filter;

FIG. 4 is a schematic diagram illustrating another example of a linear smoothing filter;

DESCRIPTION OF EMBODIMENTS

Detailed explanation follows regarding an exemplary embodiment of technology disclosed herein, with reference to the drawings.

First Exemplary Embodiment

Figure 1:
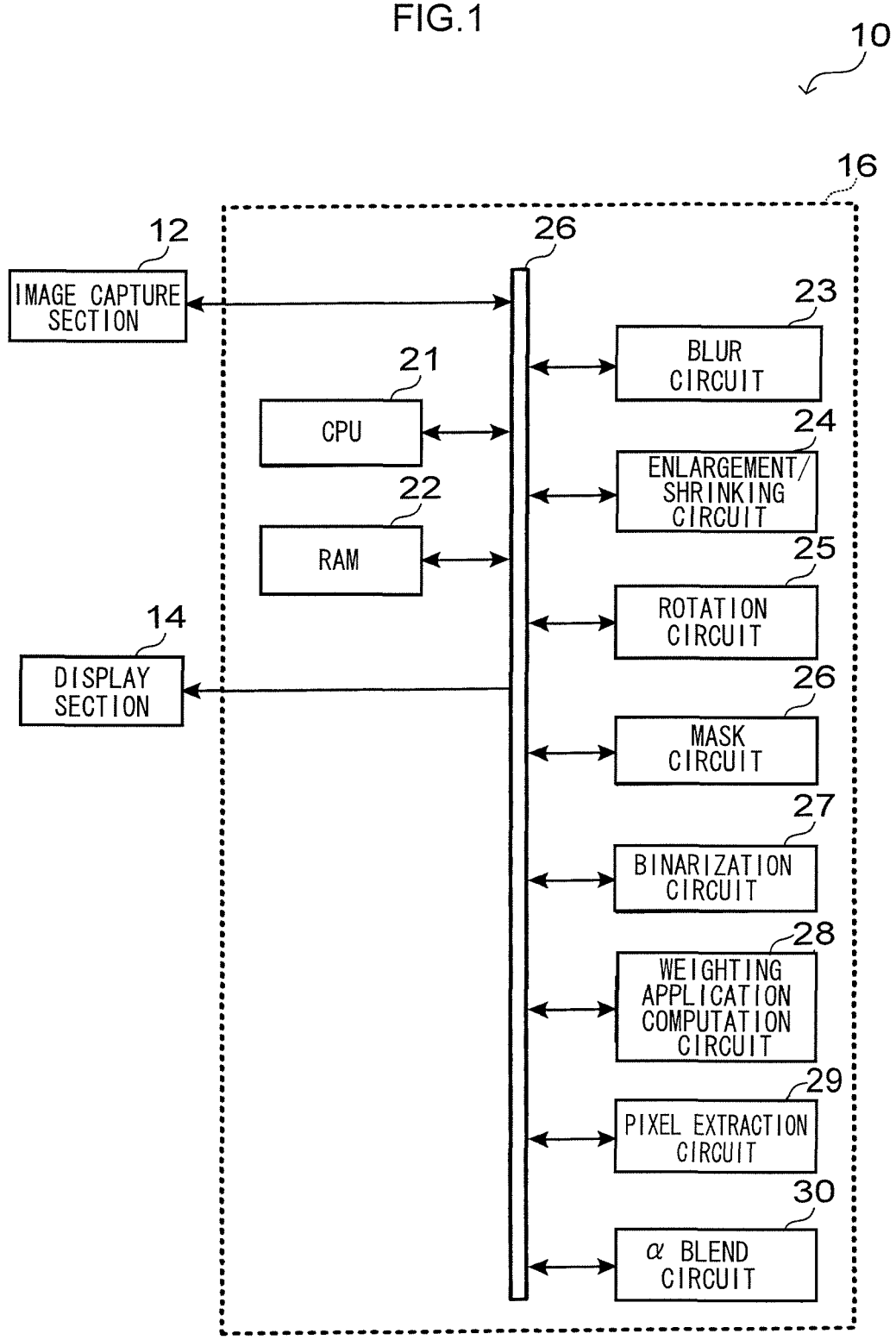
FIG. 1 is a block diagram illustrating an example of a configuration of an imaging apparatus according to a first exemplary embodiment.

FIG. 1 illustrates an imaging apparatus 10 according to a first exemplary embodiment. The imaging apparatus 10 includes an image capture section 12, a display section 14 and an image processing section 16.

The image capture section 12 includes an image pick-up device such as for example a Charge Coupled Device (CCD) or a Complementary Metal Oxide Semiconductor (CMOS), and a lens section including a group of lenses including for example plural optical lenses, an aperture adjustment mechanism, a zoom mechanism and an automatic focus point adjustment mechanism. Note that the zoom mechanism may be omitted, and change in the imaging times implemented by an electronic zoom. On instruction to take an image, the image capture section 12 converts an electrical signal (analogue signal) image captured by the image pick-up device according to set imaging conditions into a digital signal. The converted digital signal is also converted into YCbCr image data that has been subjected to processing such as color interpolation processing and gamma processing, and then output.

The display section 14 is, for example, a liquid crystal display. The display section 14 displays an image that has been captured with the image capture section 12 and image processed by the image processing section 16. Configuration may be made such that a menu screen is displayed for performing various types of setting.

The image processing section 16, as illustrated in FIG. 1, includes a Central Processing Unit (CPU) 21 and a Random Access Memory (RAM) 22. The image processing section 16 also includes a blur circuit 23, an enlargement/shrinking circuit 24, a rotation circuit 25, a mask circuit 26, a binarization circuit 27, a weighting application computation circuit 28, a pixel extraction circuit 29, and an α blend circuit 30. The image processing section 16 is, for example, an image processing processor. The image processing section 16 receives YCbCr image data that has been input from the image capture section 12, and performs processing described later. Note that the image processing section 16 serves as an example of an image processing apparatus of technology disclosed herein.

The CPU 21 instructs the image capture section 12 to perform image capture according to specific image capture conditions, acquires the YCbCr image output from the image capture section 12 and stores it in the RAM 22. The CPU 21 controls the input and output of data between the RAM 22 and the blur circuit 23, the enlargement/shrinking circuit 24, the rotation circuit 25, the mask circuit 26, the binarization circuit 27, the weighting application computation circuit 28, the pixel extraction circuit 29 and the α blend circuit 30.

The blur circuit 23 employs a linear filter expressed in terms of h(k, l) in the following Equation (1) to perform blur processing on the input image.

$$g(i, j) = \sum_{l=-w}^{w} \sum_{k=-w}^{w} f(i+k, j+l)h(k, l) \quad (1)$$

Wherein: f(i, j) are pixel values of pixel (i, j) in the input image; g(i, j) are pixel values of pixel (i, j) in the output image; and w is a value representing how many pixels worth above and below, and to the left and right, of the pixel in question the linear filter has corresponding filter coefficients for, namely a value representing the size of the linear filter. For example, when w=1, the size of the linear filter is 3×3, and when w=2 the size is 5×5.

Figure 2:
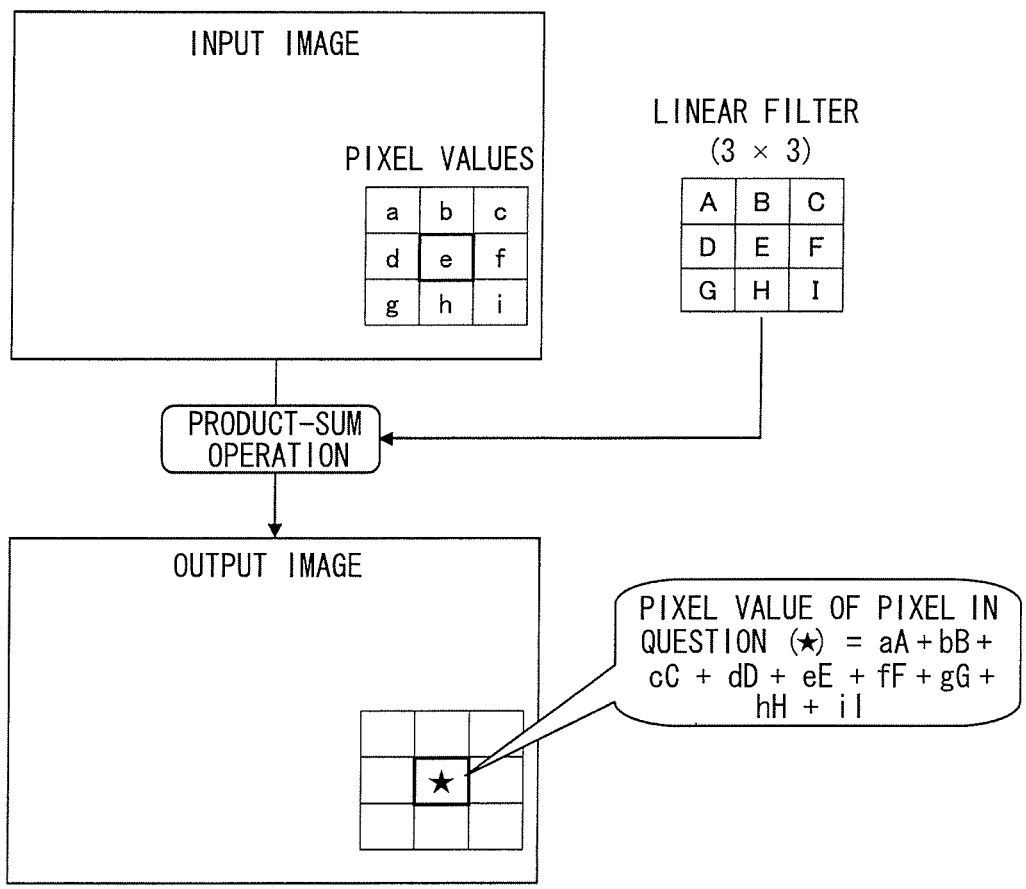
FIG. 2 is a schematic diagram to explain a linear filter.

For example, as illustrated in FIG. 2, explanation follows regarding a case in which a 3×3 sized linear filter that has respective filter coefficients of A, B, C, D, E, F, G, H, I is applied to the pixel in question in the input image (illustrated by the bold line in FIG. 2). The pixel values of the peripheral 3×3 pixels containing the pixel in question are a, b, c, d, e, f, g, h. In such as case, the pixel value of the pixel in question in the output image (illustrated by a star in FIG. 2) is computed by product-sum operation as illustrated in Equation (1) to give aA+bB+cC+dD+eE+fF+gG+hH+iI. The blur circuit 23 is able to implement various functions such as blur processing and edge extraction processing according to the manner in which the filter coefficients are applied.

A linear filter with a sum of filter coefficients of 1 has a blur effect. The above calculation corresponds to averaging processing of pixel values of the pixels contained within the region to which the linear filter is applied. Such a filter is referred to below as a "linear smoothing filter". Note that simple averaging is performed when the filter coefficients are all the same as each other, as illustrated in FIG. 3, and blur processing is performed by processing corresponding to weighted averaging when the filter coefficients are not the same as each other, as illustrated in FIG. 4. Any linear smoothing filter may be employed in the present exemplary embodiment.

The enlargement/shrinking circuit 24 enlarges the input image with a set enlargement the ratio, or shrinks the input image with a set shrinking ratio before outputting. Note that it is possible to set the enlargement ratio and the shrinking ratio independently in the horizontal direction and the vertical direction of the input image.

The rotation circuit 25 rotates the input image by a set rotation angle before outputting.

The mask circuit 26 applies a mask to the input image, and outputs an image that has had different processing applied in a mask region, where the mask is, to that of regions other than the mask region.

The binarization circuit 27 compares the pixel values of each of the pixels of the input image to a set threshold value, and binarizes such that pixels with pixel values of the threshold value or greater are given a first pixel value, and pixels with pixel values less than the threshold value are given a second pixel value, and then outputs the binarized image.

The weighting application computation circuit 28 outputs an image computed by weighting and summing pixel values of respective pixels of corresponding pixels between plural input images.

The pixel extraction circuit 29 extracts pixels from the input image with pixel values matching set conditions.

The α blend circuit 30 outputs an image of each of the plural input images synthesized together based on a set blend ratio.

Figure 5:
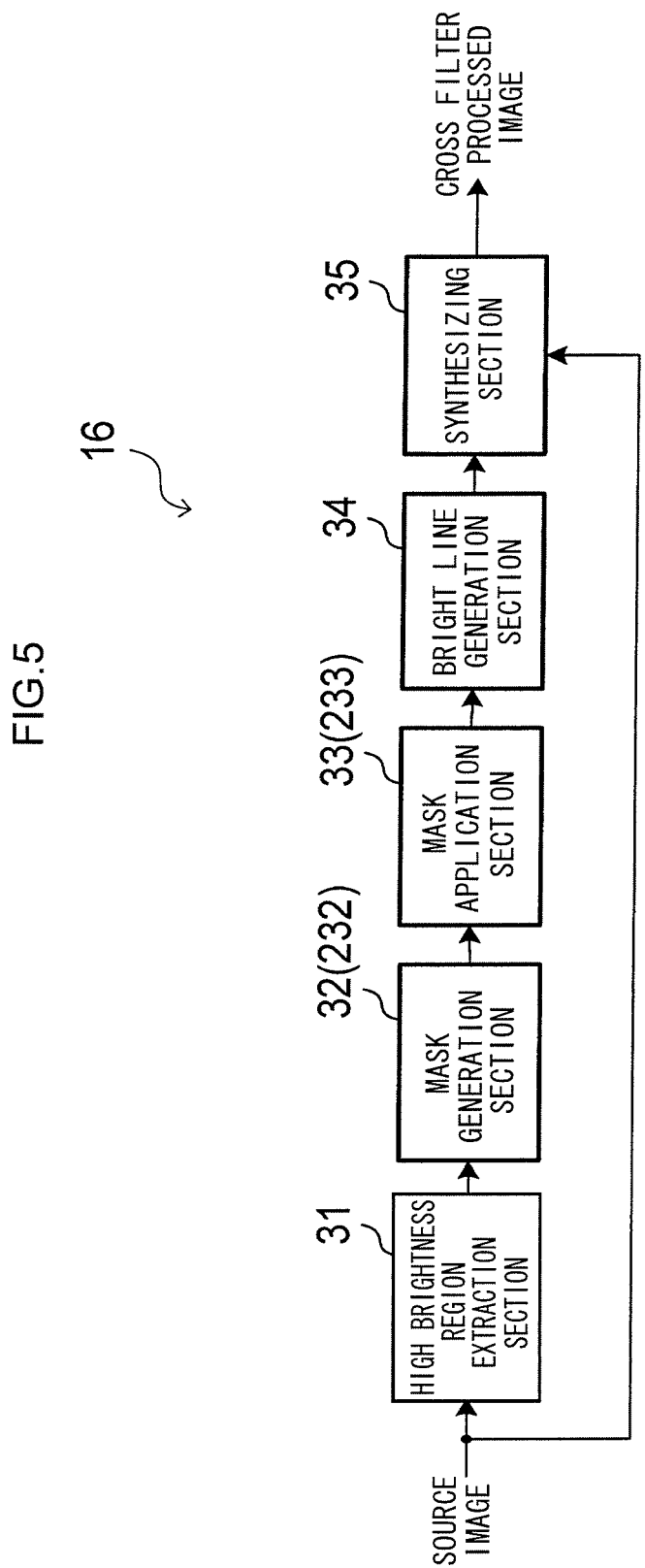
FIG. 5 is a block diagram illustrating an example of functional configuration of an image processing section according to the first exemplary embodiment.

An example of a functional configuration of the image processing section 16 is illustrated in FIG. 5. The image processing section 16 includes a high brightness region extraction section 31, a mask generation section 32, a mask application section 33, a bright line generation section 34 and a synthesizing section 35. Each of the functional section is implemented by one of the circuits illustrated in FIG. 1, or by a combination of plural thereof. For example, the high brightness region extraction section 31 is implemented by a pixel extraction circuit 29. The mask generation section 32 is, for example, implemented by the blur circuit 23 and the binarization circuit 27. The mask application section 33 is for example implemented by the mask circuit 26 and the α blend circuit 30. The bright line generation section 34 is for example implemented by the blur circuit 23, the enlargement/shrinking circuit 24, the rotation circuit 25 and the pixel extraction circuit 29. The synthesizing section 35 is for example implemented by the weighting application computation circuit 28.

The high brightness region extraction section 31 scans a Y image expressing the Y component of the YCbCr image input from the image capture section 12, and outputs a high brightness region extraction image in which pixels or pixel groups that have a brightness value that is the pre-set specific threshold value or greater are extracted.

The mask generation section 32 performs processing that is a combination of blur processing and binarization processing on the high brightness region extraction image, and generates a mask that has a mask region corresponding to a high brightness region of a specific size or above (referred to below as "large surface area high brightness region"). Explanation follows regarding a specific mask generation method. For ease of explanation, explanation follows regarding generating a mask for a high brightness region of diameter R pixels when the brightness values of all the pixel contained in the high brightness region are the same as each other. A case is considered in which the threshold value for extracting the high brightness region is an upper limit value Ymax for brightness value.

Figure 6:
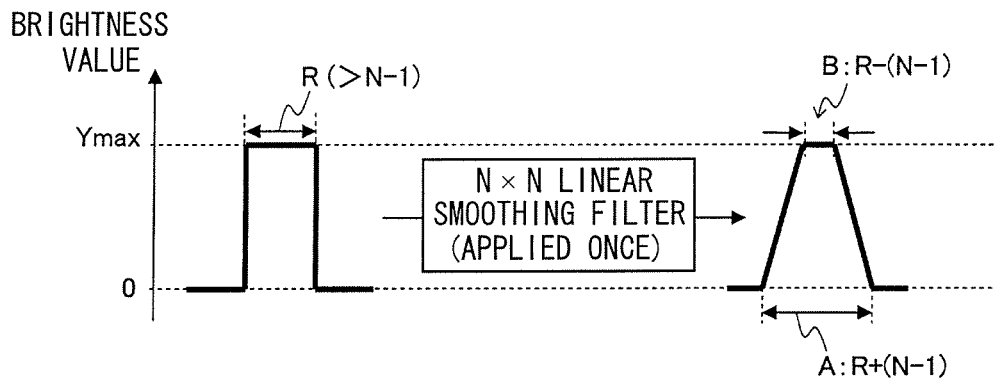
FIG. 6 is a schematic diagram to explain processing of a mask generation section.
Figure 7:
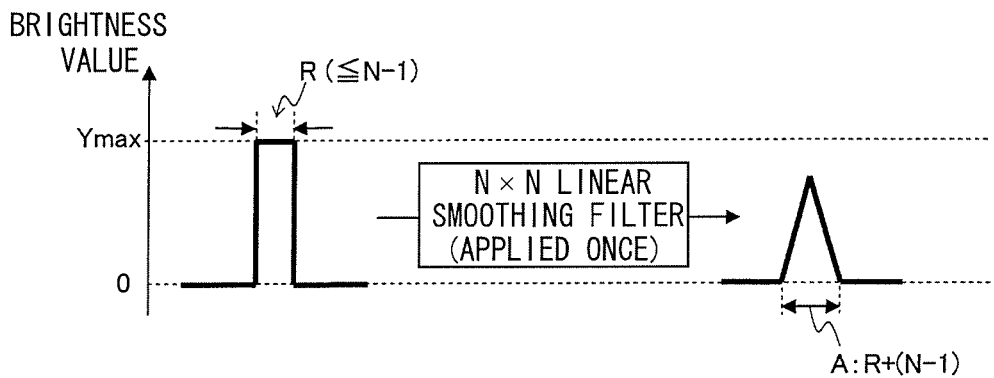
FIG. 7 is a schematic diagram to explain processing of a mask generation section.

FIG. 6 illustrates brightness values for each of the pixel position in a diameter direction of the above high brightness region. When an N×N linear smoothing filter is applied once to the high brightness region, as illustrated at A in FIG. 6, the number of pixels in the diameter direction of the high brightness region spread out from about (N−1) pixels worth, to R+(N−1) pixels. However, after application of the N×N linear smoothing filter, since the brightness values at the peripheral portion of the filter application region is reduced, the pixels capable of holding the maximum brightness value (in this case Ymax) within the high brightness region prior to application of the filter, are now about R−(N−1) pixels, as illustrated at B in FIG. 6. Thus when R becomes about (N−1) or lower, as illustrated in FIG. 7, there are no longer pixels capable of holding the maximum brightness value prior to application of the filter, and the brightness values of all of the pixels are reduced to values that are less than the maximum brightness value.

Figure 8:
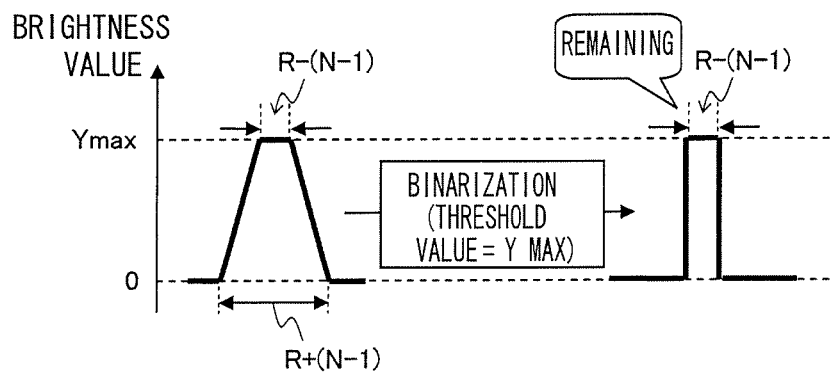
FIG. 8 is a schematic diagram to explain processing of a mask generation section.
Figure 9:
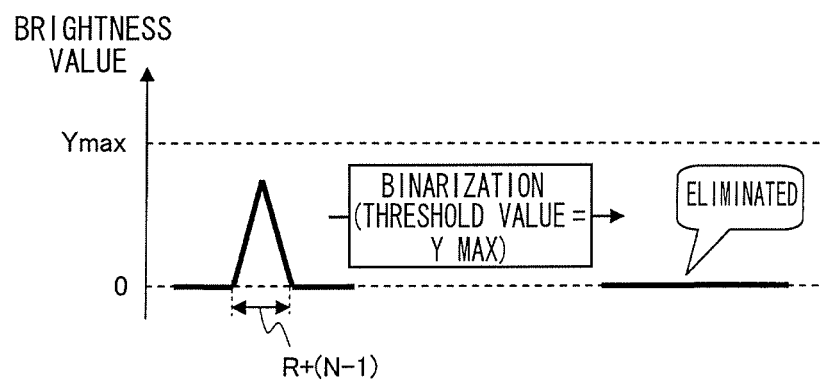
FIG. 9 is a schematic diagram to explain processing of a mask generation section.

As described above, when the diameter of the high brightness region is R>N−1, there are still pixels that hold the maximum brightness value prior to filter application (in this case Ymax) even when the N×N linear smoothing filter is applied once. Therefore, as illustrated in FIG. 8, performing binarization processing with Ymax as with the threshold value, such that the brightness values of pixels with brightness values of Ymax or above are made Ymax, and the brightness values of pixels with brightness values less than the Ymax are made 0, enables only pixels of brightness value Ymax to be left remaining. However, when the diameter of the high brightness region is R≤N−1, application once of the N×N linear smoothing filter results in there being no pixels remaining with the maximum brightness value prior to filter application. Consequently, as illustrated in FIG. 9, a region with brightness values is eliminated by performing binarization processing with Ymax as the threshold value. Note that substantially the same result is obtained by setting the threshold value for high brightness region extraction at a slightly smaller brightness value than the Ymax (=YH), and performing binarization processing with YH.

Figure 10:
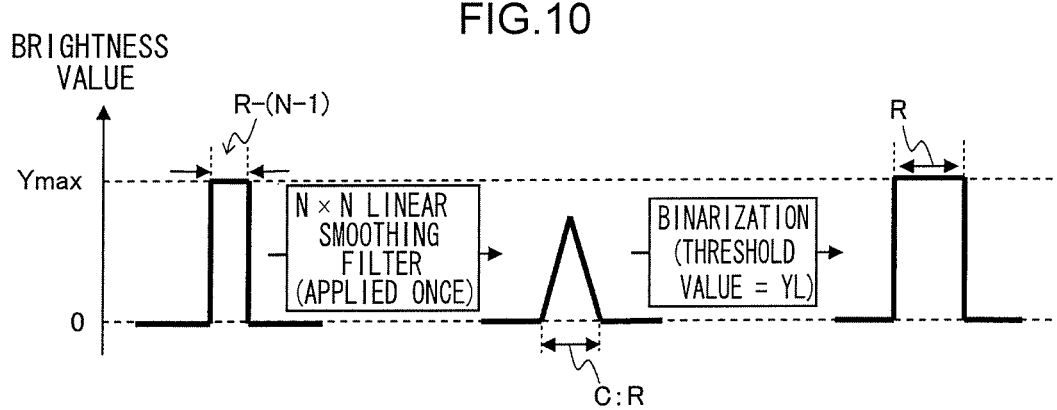
FIG. 10 is a schematic diagram to explain processing of a mask generation section.

The N×N linear smoothing filter is then applied once to the remaining high brightness region. Thereby, as illustrated at C in FIG. 10, the high brightness region widens to R. Then with a threshold value of a low brightness value (=YL, for example YL=1 to extract pixels with brightness values other than 0), binarization processing is performed such that pixels with a brightness value of YL or greater are given brightness values of Ymax, and pixels with pixel values are 0 are given brightness values of 0. A mask having a mask region of diameter R is accordingly generated.

The mask generation section 32 accordingly performs processing that is a combination of blur processing set with an appropriately large N sized linear smoothing filter, and binarization processing using a threshold value during high brightness region extraction. This accordingly enables generation of a mask with a mask region corresponding to a high brightness region of a specific size (N−1 in the above example) or greater.

Moreover, there is no limitation to cases in which the specific size is controlled by only an N sized linear smoothing filter. For example, when blur processing is performed using an n×n (n<N) linear smoothing filter, an image to be blur processed is first shrunk to (n−1)/(N−1) and the n×n linear smoothing filter is applied once. Then a similar result may be obtained by expanding the image back to its original size, and then applying the N×N linear smoothing filter once.

Moreover, an n×n linear smoothing filter may be applied plural times (k times) without shrinking the image that is to be subjected to blur processing. In such cases, the number of filter application times k may be set at k=(N−1)/(n−1). When an n×n linear smoothing filter is applied k times, the number of pixels in the diameter direction of the high brightness region illustrated in A of FIG. 6 becomes about R+k (n−1) pixels, and the number of pixels in the diameter direction of the high brightness region illustrated at B in FIG. 6 becomes about R−k (n−1) pixels.

However, when the number of filter application times k becomes large (for example k≥10), the number of pixels in the diameter direction of the high brightness region illustrated by B in FIG. 6 becomes larger than about R−k (n−1), and sometimes a specific mask region is not obtained. To address this, filter application may be made repeatedly performed by binarizing with the high brightness threshold value YH each time the n×n linear smoothing filter is applied.

Moreover, there is a possibility that peripheral portions of a large surface area high brightness region remain after mask application when the size of the mask region is substantially the same size as the original high brightness region prior to mask generation. Therefore the mask region may be generated so as to be slightly larger than the original high brightness region. The number of times the n×n linear smoothing filter is applied k=(N−1)/(n−1) is accordingly increased by about 1.

Moreover, it is desirable to obtain a similar result irrespective of the input image size when a cross-filter effect is applied. Namely, it is desirable that no variation arises between locations where a bright line is applied and locations where it is not applied between cases in which the same image processing is performed with a changed number of pixels (resolution). Therefore, when performing blur processing, the larger the size of the high brightness region extraction image the wider the blur needs to spread out. Increasing the number of times the linear smoothing filter is applied according to the size of the high brightness region extraction image might also be contemplated, however since this is not desirable from the perspective of the processing time, parameter adjustment needs to be made according to the image size.

During blur processing, the mask generation section 32 performs blur processing after converting the high brightness region extraction image to a specific size (for example VGA), and then returns the size to the original size after the mask region has been extracted. This thereby enables a similar result to be obtained irrespective of the input image size. Note that although quality of an image generally deteriorates by shrinking and enlarging an image, since the objective of the mask generation section 32 is merely to generate a mask, deterioration in image quality is not a problem.

The mask application section 33 applies the mask generated by the mask generation section 32 to the high brightness region extraction image, and high brightness regions corresponding to the mask region are removed from the high brightness region extraction image. The mask application section 33 outputs the image after application of the mask as a mask applied image.

The bright line generation section 34 performs processing on the mask applied image such as blur processing, enlargement/shrinking processing and rotation processing to generate a bright line image.

The synthesizing section 35 synthesizes the bright line image generated by the bright line generation section 34 onto the source image (YCbCr image), and generates a cross-filter processed image.

Explanation next follows regarding operation of the imaging apparatus 10 according to the first exemplary embodiment. On image capture instruction by the CPU 21, an image is captured by the image capture section 12, and YCbCr image data representing the source image is stored in a specific storage region. Then, in a state in which a cross filter processing mode is set, in order to display the source image on the display section 14, the YCbCr image data representing the source image is stored in the RAM 22, and image processing as illustrated in FIG. 11 is executed by the image processing section 16.

Figure 11:
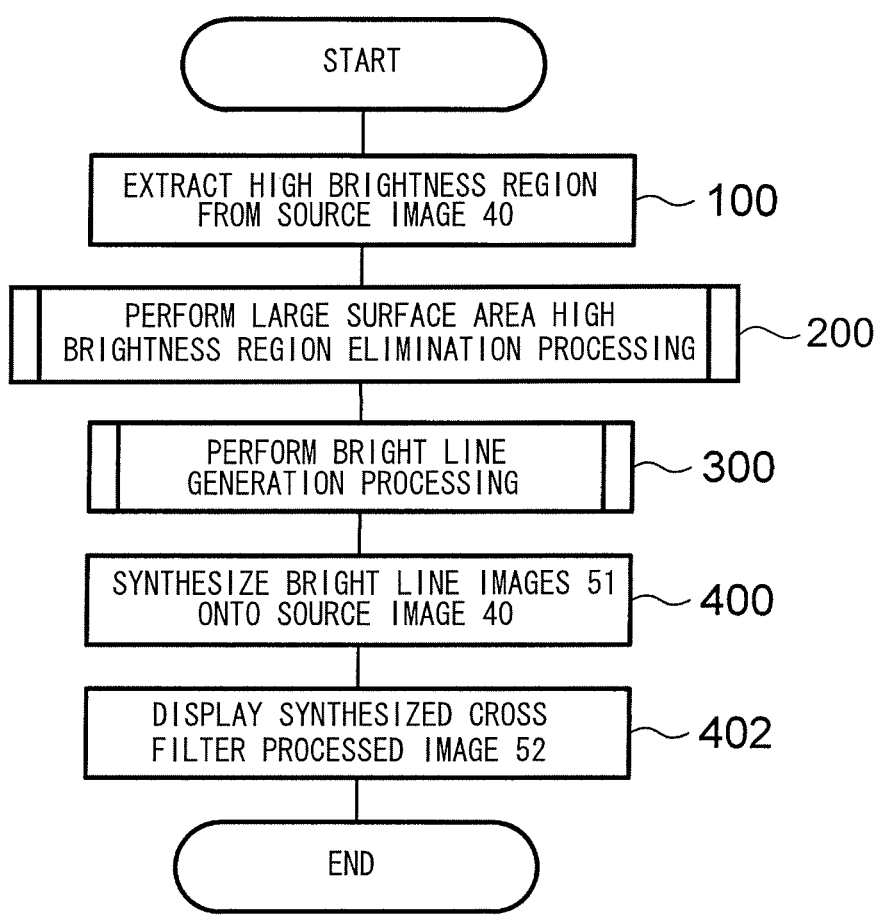
FIG. 11 is a flow chart illustrating image processing in the first exemplary embodiment.
Figure 12:
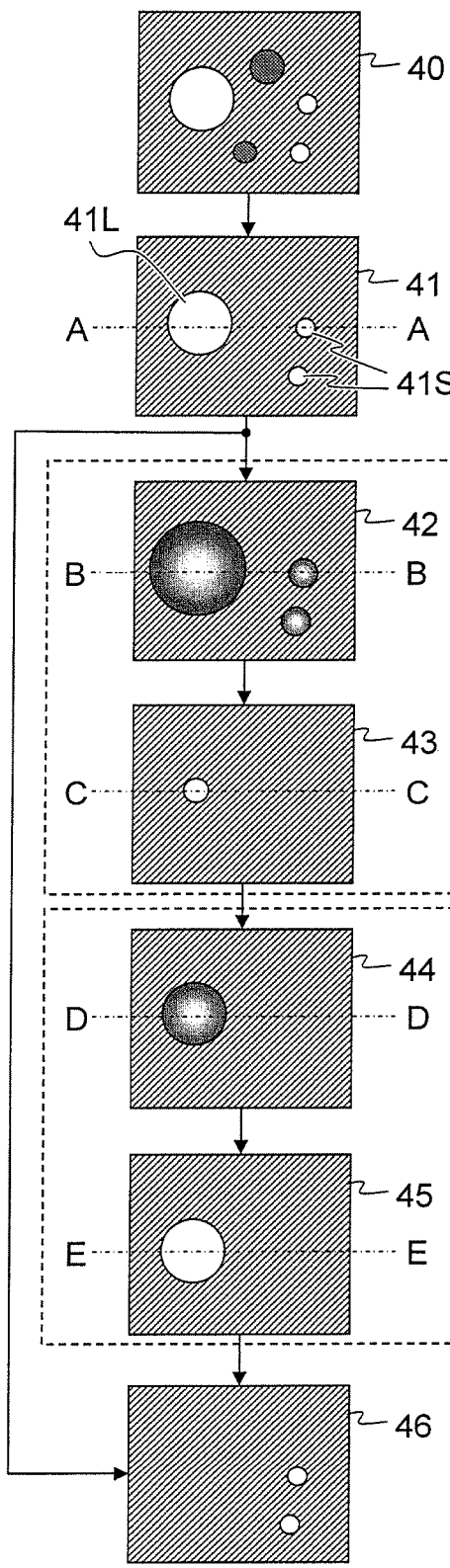
FIG. 12 is a diagram to explain image processing in the first exemplary embodiment.

At step 100 of the image processing illustrated in FIG. 11, the CPU 21 inputs the pixel extraction circuit 29 with a Y image stored in the RAM 22 and expressing the Y component of the YCbCr image, that is the source image 40 illustrated in FIG. 12. The pixel extraction circuit 29 scans the Y image, and extracts as a high brightness region any pixels or pixel groups that have brightness values that are a pre-set specific threshold value YH or greater, and outputs a high brightness region extraction image 41 such as that illustrated in FIG. 12. The whiter regions in the high brightness region extraction image 41 of FIG. 12 are high brightness regions 41L, 41S. Note that for the purpose of explanation, a case is considered in which the high brightness region 41L is a high brightness region with large surface area that needs to be eliminated, and the high brightness regions 41S are high brightness regions not to be eliminated. Moreover, brightness values corresponding to the pixel positions on the line A-A of the high brightness region extraction images 41 in FIG. 12 are represented at 41A in FIG. 13. Note that the processing of the present step is processing of the high brightness region extraction section 31 in the functional block diagram illustrated in FIG. 5.

At the next step 200, large surface area high brightness region elimination processing is executed. Explanation next follows regarding execution of the large surface area high brightness region elimination processing, with reference to FIG. 14.

Figure 14:
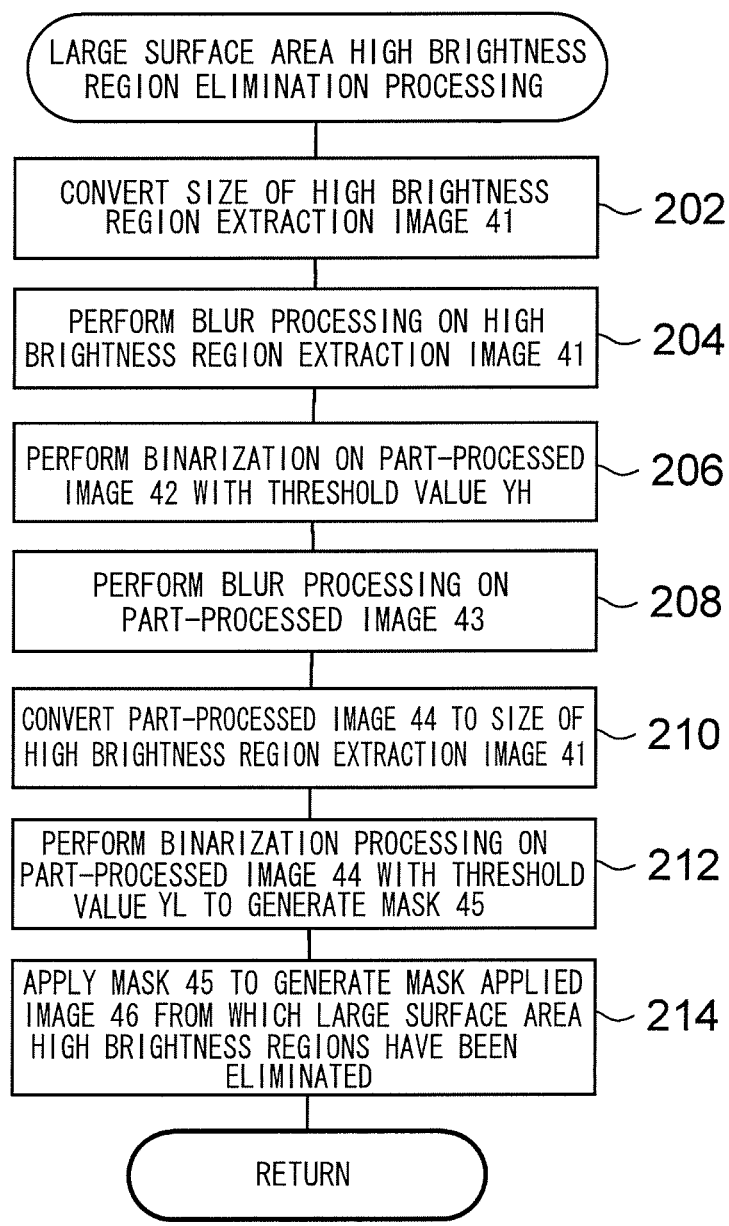
FIG. 14 is a flow chart illustrating high brightness region elimination processing for a large surface area.

At step 202 of the high brightness region elimination processing of large surface area illustrated in FIG. 14, the CPU 21 inputs to the enlargement/shrinking circuit 24 the high brightness region extraction image 41 output from the pixel extraction circuit 29. The enlargement/shrinking circuit 24 converts the high brightness region extraction image 41 to a specific size by enlarging or shrinking.

At the next step 204, the CPU 21 inputs the blur circuit 23 with the high brightness region extraction image 41 that has been converted in size from that output from the enlargement/shrinking circuit 24. The blur circuit 23 performs blur processing on the input high brightness region extraction image 41 by for example applying the N×N linear smoothing filter once, and outputs a part-processed image 42 as illustrated in FIG. 12. Moreover, 42B of FIG. 13 expresses the brightness values corresponding to pixel positions on the line B-B of the part-processed image 42 of FIG. 12. Pixels with brightness values of YH or greater remain in the region of the part-processed image 42 corresponding to the high brightness region 41L, however there are no pixels remaining with brightness values of YH or greater in the regions of the part-processed image 42 corresponding to the high brightness regions 41S.

At the next step 206, the CPU 21 inputs the part-processed image 42 to the binarization circuit 27. The binarization circuit 27 performs binarization processing with a threshold value of brightness value YH on the input part-processed image 42, so as to output a part-processed image 43 as illustrated in FIG. 43 of FIG. 12. 43C of FIG. 13 expresses the brightness values corresponding to the pixel positions on the line C-C of part-processed image 43 in FIG. 12. A shrunk region of high brightness region 41L remains in the region of the part-processed image 43 corresponding to the high brightness region 41L, and regions with brightness values are eliminated from the regions of the part-processed image 43 corresponding to the high brightness regions 41S.

At the next step 208, the CPU 21 inputs the part-processed image 43 to the blur circuit 23. The blur circuit 23, similarly to at step 204, performs blur processing on the input part-processed image 43, and for example applies the N×N linear smoothing filter once. A part-processed image 44 such as that illustrated in FIG. 12 is output. 44D in FIG. 13 expresses the brightness values corresponding to the pixel positions on the line D-D of the part-processed image 44 in FIG. 12.

At the next step 210, the CPU 21 inputs the part-processed image 44 to the enlargement/shrinking circuit 24. The enlargement/shrinking circuit 24 converts the part-processed image 44 to the size of the original high brightness region extraction image 41 by enlarging or shrinking. In the part-processed image 44 that has been converted back to the original size, the region with brightness values spreads out to substantially the same size as the high brightness region 41L in the original high brightness region extraction image 41.

Figure 13:
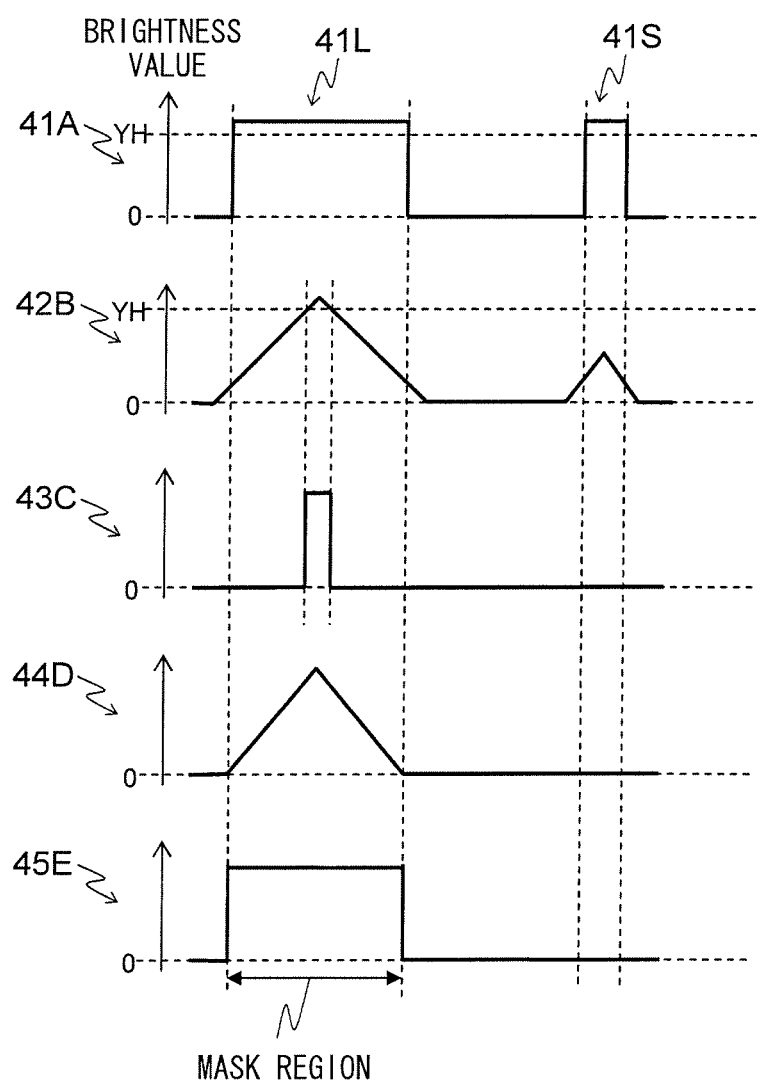
FIG. 13 is a schematic diagram to explain mask generation in the first exemplary embodiment.

At the next step 212, the CPU 21 inputs the size-converted part-processed image 44 to the binarization circuit 27. The binarization circuit 27 performs binarization processing of the input part-processed image 44 with the low brightness threshold value YL, and generates a mask 45 as annotated by 45 in FIG. 12. 45E of FIG. 13 represents brightness values corresponding to the pixel positions on the line E-E of mask 45 of FIG. 12. The mask 45 is accordingly generated with a mask region corresponding to the high brightness region 41L.

At the next step 214, the CPU 21 inputs the mask 45 and the high brightness region extraction image 41 to the mask circuit 26. The mask circuit 26 applies the mask 45 to the high brightness region extraction image 41, and outputs a mask applied image 46 in which the large surface area high brightness region inside the high brightness region extraction image 41 corresponding to the mask region of the mask 45 has been eliminated, and processing returns to the image processing illustrated in FIG. 11.

Note that the processing of steps 202 to 212 above is processing in the mask generation section 32 of the functional block diagram illustrated in FIG. 5, and the processing of step 214 is processing in the mask application section 33 of the functional block diagram illustrated in FIG. 5.

Then, at step 300 of the image processing illustrated in FIG. 11, bright line generation processing is executed. Explanation follows regarding the bright line generation processing, with reference to FIG. 15. Explanation follows here regarding a case in which two bright lines are generated in order to realize a cross-filter effect of with a cross-shape on one high brightness region.

Figure 15:
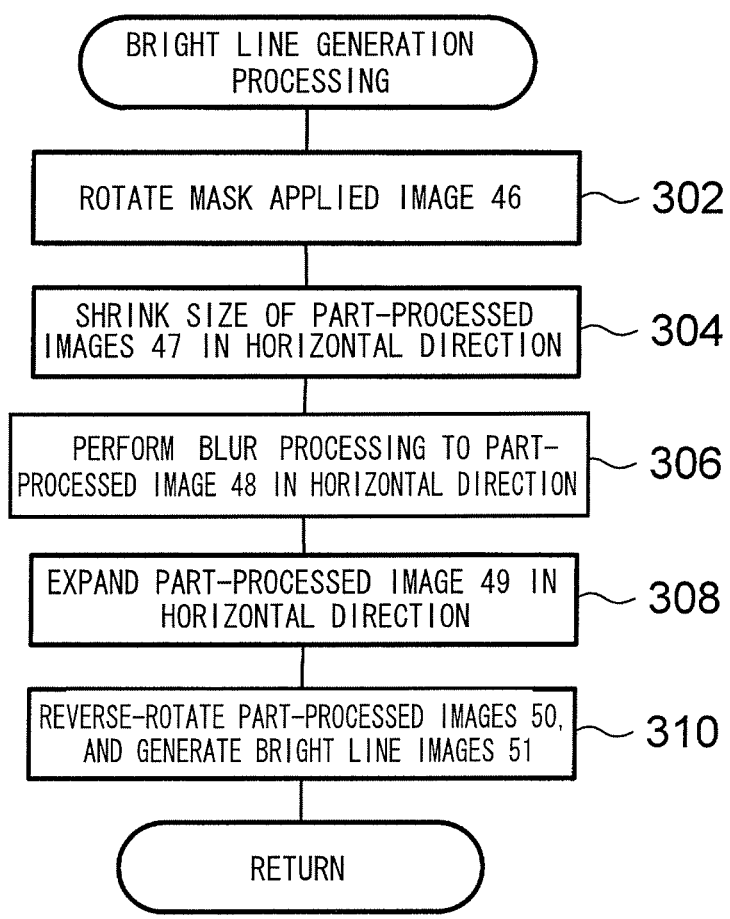
FIG. 15 is a flow chart illustrating bright line generation processing.
Figure 16:
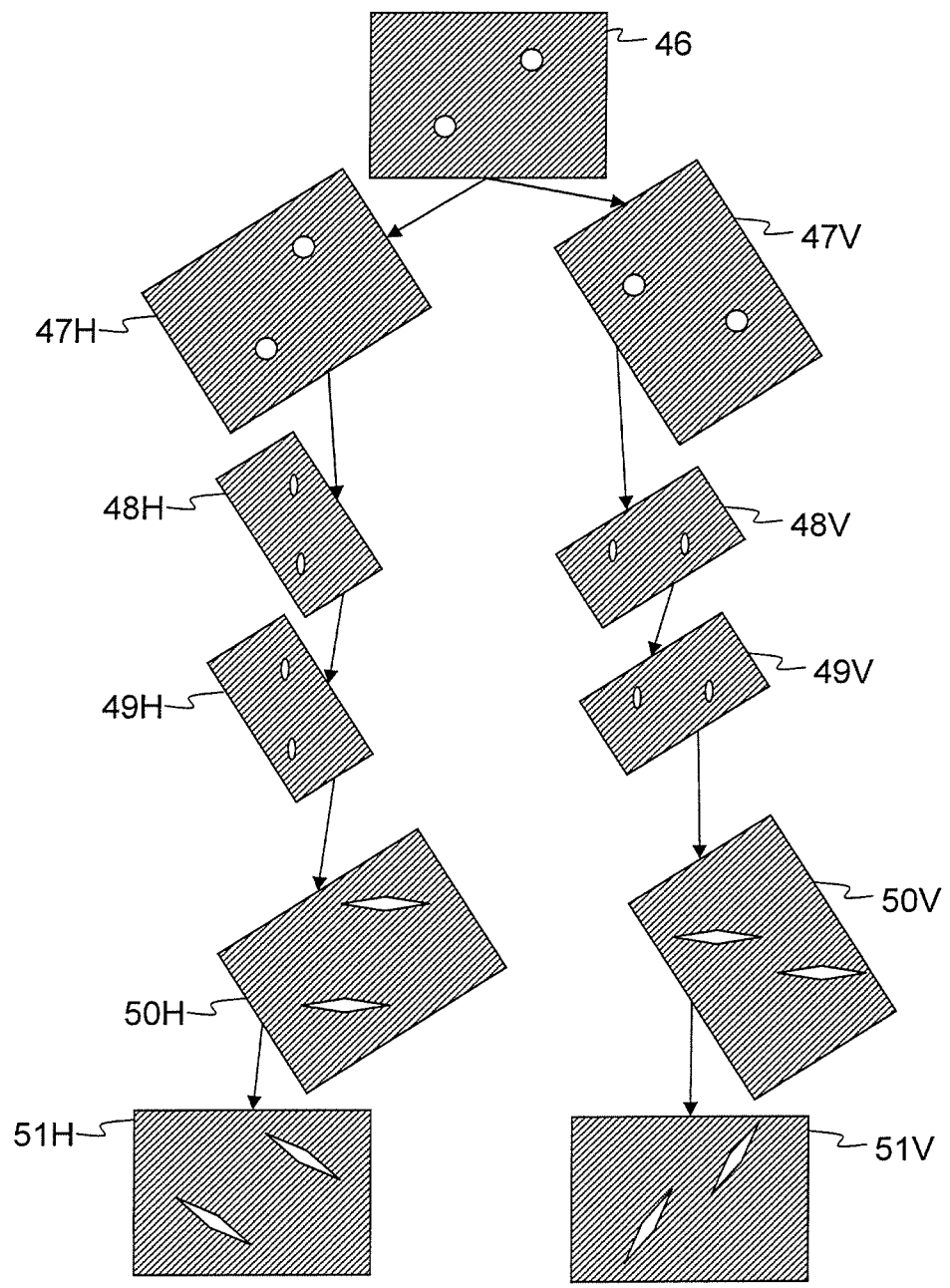
FIG. 16 is a diagram to explain bright line generation.

At step 302 of the bright line generation processing illustrated in FIG. 15, the CPU 21 inputs the mask applied image 46 output from the mask circuit 26 to the rotation circuit 25. The rotation circuit 25 rotates the mask applied image 46 by a specific angle and outputs the part-processed images 47H, 47V as illustrated in FIG. 16. For example, the part-processed image 47H is generated by rotating the mask applied image 46 to the left by an angle α, and the part-processed image 47V is generated by rotating the mask applied image 46 to the right by an angle β. The angles α and β are set according to the angles of the bright lines to be generated. α+β may for example be set such that α+β=90° to give the angle formed by the two bright lines.

Next, at step 304, the CPU 21 inputs the part-processed images 47H, 47V to the enlargement/shrinking circuit 24. The enlargement/shrinking circuit 24 shrinks the size in the horizontal direction of each of the part-processed images 47H, 47V, and outputs part-processed images 48H, 48V as illustrated in FIG. 16. The shrink ratio may be set according to the length of the bright line to be generated, and may be a value that is larger the longer the length of the bright line.

Then at step 306, the CPU 21 inputs the part-processed images 48H, 48V to the blur circuit 23. The blur circuit 23 performs blur processing in the horizontal direction on each of the part-processed images 48H, 48V, and outputs part-processed images 49H, 49V as illustrated in FIG. 16.

At the next step 308, the CPU 21 inputs the part-processed images 49H, 49V to the enlargement/shrinking circuit 24. The enlargement/shrinking circuit 24 enlarges each of the part-processed images 49H, 49V until their respective horizontal direction sizes are the size of the original mask applied image 46, and outputs part-processed images 50H, 50V as illustrated in FIG. 16.

At the next step 301, the CPU 21 inputs the part-processed images 50H, 50V to the rotation circuit 25. The rotation circuit 25 rotates each of the part-processed images 50H, 50V in the opposite rotation direction to the rotation performed at step 302, and outputs bright line images 51H, 51V as illustrated in FIG. 16. Processing then returns to the image processing illustrated in FIG. 11.

Note that the bright line generation processing is the processing in the bright line generation section 34 of the functional block diagram illustrated in FIG. 5.

Figure 17:
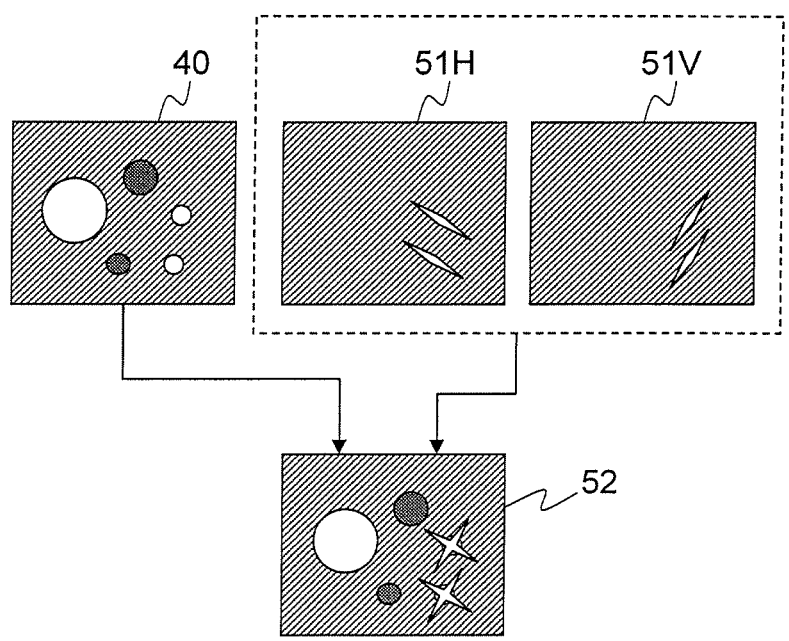
FIG. 17 is a diagram to explain synthesis of bright lines.

Next, at step 400 of the image processing illustrated in FIG. 11, the CPU 21 inputs the generated bright line images 51H, 51V and the source image 40 to the weighting application computation circuit 28. The weighting application computation circuit 28, as illustrated in FIG. 17, synthesizes the bright line images 51H, 51V onto the source image 40 as illustrated in FIG. 17, to generate and output a synthesized cross filter processed image 52.

At the next step 402, the CPU 21 stores the cross filter processed image 52 output from the weighting application computation circuit 28 in the RAM 22, and controls to display the cross filter processed image 52 on the display section 14, then ends image processing.

Note that the processing of step 400 and step 402 is the processing of the synthesizing section 35 of the functional block diagram illustrated in FIG. 5.

As explained above, according to the imaging apparatus according to the first exemplary embodiment, a mask is generated with a mask region corresponding to a large surface area by simple processing that is a combination of blur processing and binarization processing. Then since bright lines are generated after employing this mask to the high brightness region extraction image and eliminating the large surface area high brightness region, the generation of unsightly bright lines is suppressed. Accordingly, cross filter processing is performed that raises image quality with simple processing, without needing to resort to complicated processing, such as processing to determine which high brightness regions to apply bright lines to.

Second Exemplary Embodiment

Explanation next follows regarding a second exemplary embodiment. Not that since the hardware configuration of an imaging apparatus 10 according to the second exemplary embodiment is similar to the hardware configuration of an imaging apparatus 10 according to the first exemplary embodiment as illustrated in FIG. 1, further explanation thereof will be omitted. Then functional configuration of the image processing section 16 in the second exemplary embodiment differs from the functional configuration of the image processing section 16 of the first exemplary embodiment only in a mask generation section 232 and a mask application section 233, and so explanation focuses on these points of difference.

In a high brightness region extraction image, the mask generation section 232 generates a mask with a mask region corresponding to a region in which plural high brightness regions are concentrated together at specific separations or closer (referred to below as a "concentrated high brightness region"). The mask generation section 232, similarly to the mask generation section 32 of the first exemplary embodiment, performs processing that is a combination of blur processing and binarization processing on the high brightness region extraction image, and generates a mask.

The mask application section 233 generates an overall thinned image in which thinning of high brightness regions from the high brightness region extraction image has been performed. The mask application section 233 employs an overall thinned image in the mask region of the mask generated by the mask generation section 232, and employs a high brightness region extraction image in regions other those of the mask region, and synthesizes together the high brightness region extraction image and the overall thinned image. A mask applied image is accordingly generated in which only the concentrated high brightness region has been thinned. The mask application section 233 outputs the generated mask applied image.

Figure 18:
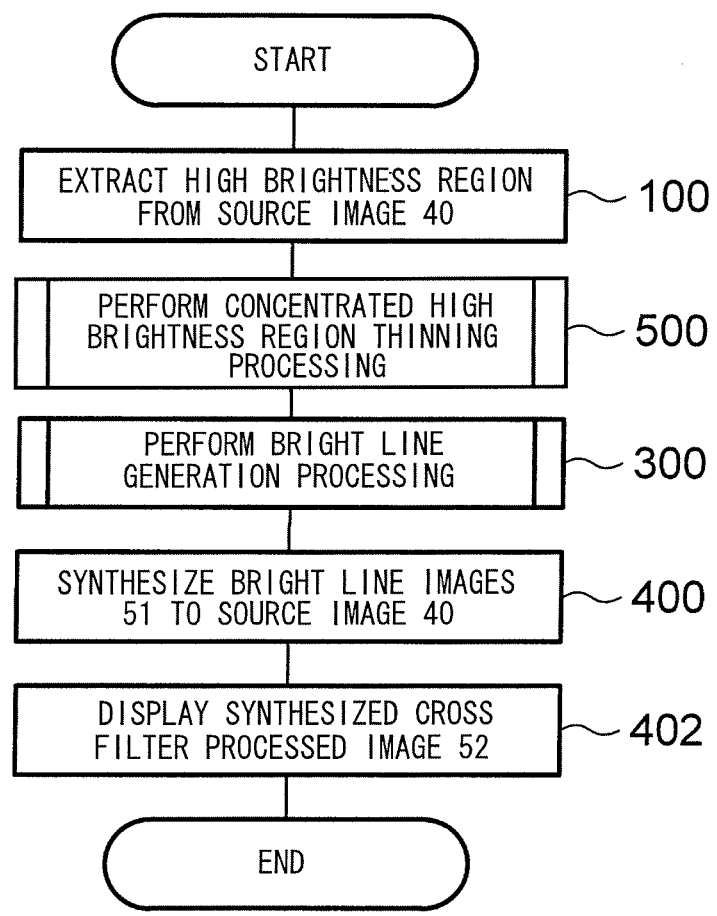
FIG. 18 is a flow chart illustrating image processing in a second exemplary embodiment.

Explanation next follows regarding operation of the imaging apparatus 10 according to the second exemplary embodiment. In the second exemplary embodiment, image processing as illustrated in FIG. 18 is implemented by the image processing section 16. In the image processing illustrated in FIG. 18, concentrated high brightness region thinning processing is executed at step 500 in place of the large surface area high brightness region elimination processing implemented at step 200 of the image processing in the first exemplary embodiment as illustrated in FIG. 11. Explanation next follows regarding concentrated high brightness region thinning processing, with reference to FIG. 19.

Figure 19:
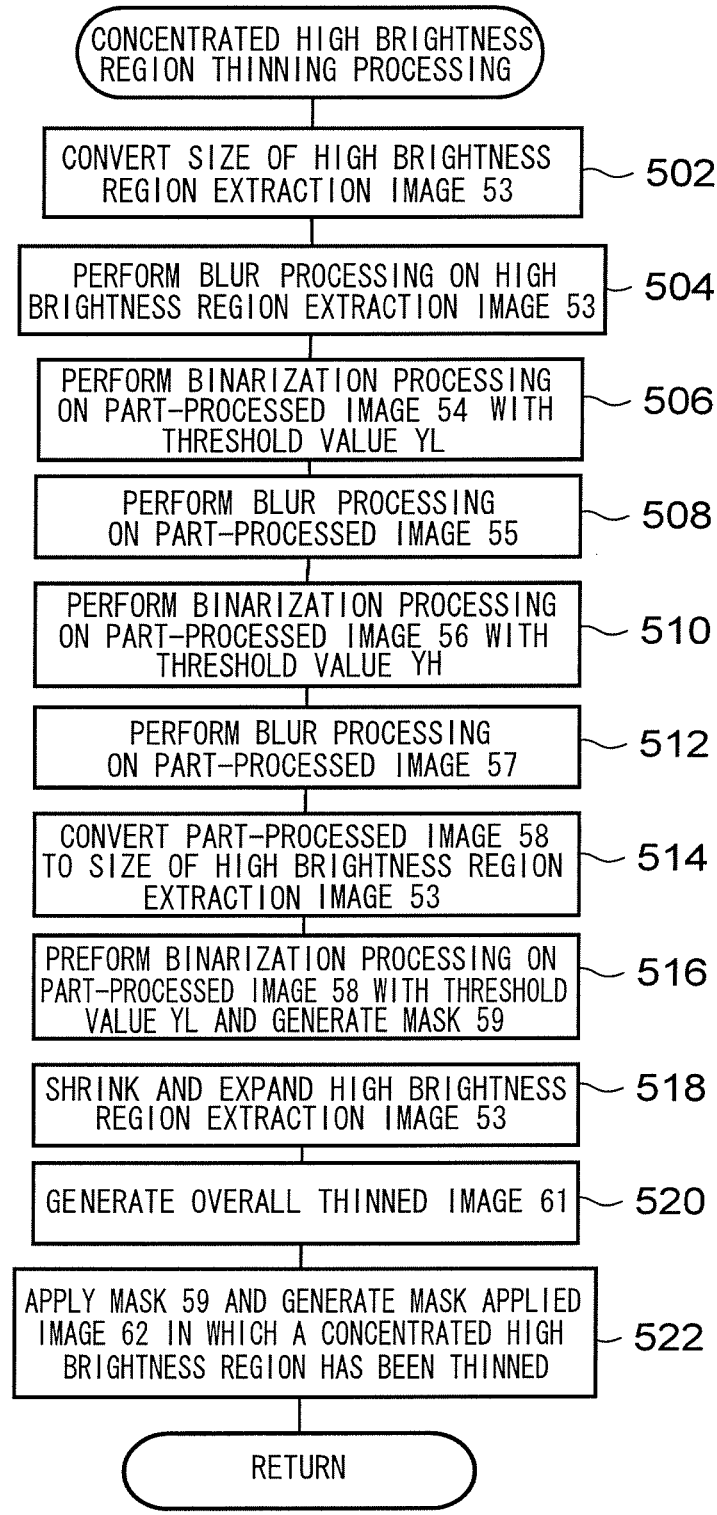
FIG. 19 is a flow chart illustrating a concentrated high brightness region thinning processing.
Figure 20:
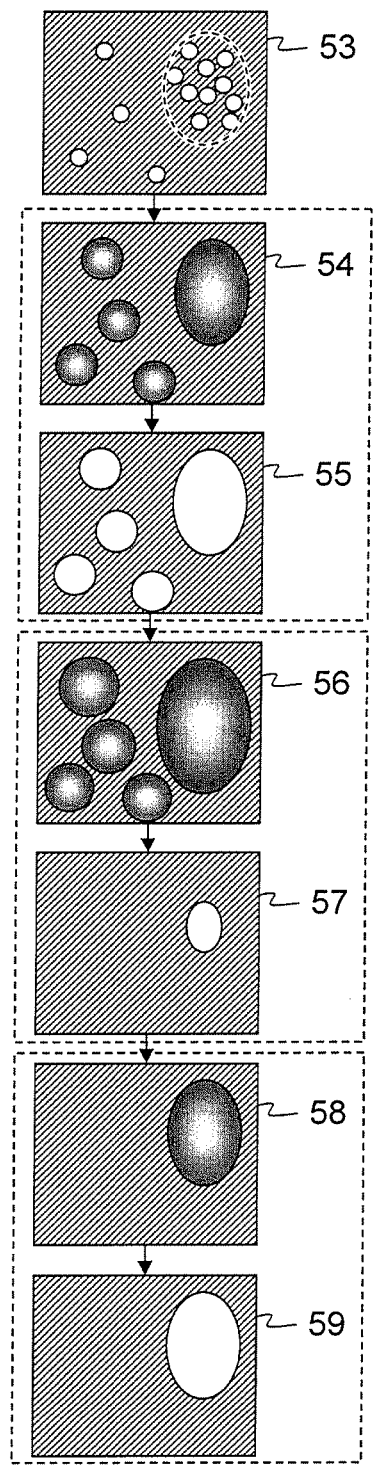
FIG. 20 is a diagram to explain the image processing in the second exemplary embodiment.

At step 502 of the concentrated high brightness region thinning processing illustrated in FIG. 19, the CPU 21 inputs to the enlargement/shrinking circuit 24, for example, a high brightness region extraction image 53 that has been output from the pixel extraction circuit 29 as illustrated in FIG. 20. Note that for explanatory purposes, a concentrated high brightness region surrounded by an intermittent line in the high brightness region extraction image 53 of FIG. 20 is assumed as the concentrated high brightness region. The enlargement/shrinking circuit 24 changes the size of the high brightness region extraction image 53 to a specific size by expanding or shrinking the high brightness region extraction image 53.

At the next step 504, the CPU 21 inputs to the blur circuit 23 the high brightness region extraction image 53 that has been size converted and output from the enlargement/shrinking circuit 24. The blur circuit 23 performs blur processing to the input high brightness region extraction image 53 by for example application once of an N×N linear smoothing filter, and outputs a part-processed image 54 as illustrated in FIG. 20. The blur processing here turns the plural high brightness regions that are concentrated together at a specific separation or closer into a single region with brightness values.

At the next step 506, the CPU 21 inputs the part-processed image 54 to the binarization circuit 27. The binarization circuit 27 performs binarization processing with low brightness threshold value YL on the input part-processed image 54, and outputs a part-processed image 55 as illustrated in FIG. 20.

At the next step 508, the CPU 21 inputs the part-processed image 55 to the blur circuit 23. The blur circuit 23 performs blur processing on the input part-processed image 55 such as applying an N×N linear smoothing filter once, and then outputs a part-processed image 56 as illustrated in FIG. 20.

At the next step 510, the CPU 21 inputs the part-processed image 56 to the binarization circuit 27. The binarization circuit 27 performs binarization processing on the input part-processed image 56 with a high brightness threshold value YH and outputs a part-processed image 57 as illustrate in FIG. 20.

At the next step 512, the CPU 21 inputs the part-processed image 57 to the blur circuit 23. The blur circuit 23 performs blur processing on the input part-processed image 57 for example so as to apply an N×N linear smoothing filter once, and then outputs a part-processed image 58 as illustrated in FIG. 20.

At the next step 514, the CPU 21 inputs the part-processed image 58 to the enlargement/shrinking circuit 24. The enlargement/shrinking circuit 24 converts the part-processed image 58 to the size of the original high brightness region extraction image 53 by enlarging or shrinking. In the part-processed image 58 converted to the original size, the region with brightness values spreads out at a size corresponding to the concentrated high brightness region of the original high brightness region extraction image 53.

At the next step 516, the CPU 21 inputs the size-converted part-processed image 58 to the binarization circuit 27. The binarization circuit 27 performs binarization processing on the input part-processed image 58 with the low brightness threshold value YL, and generates a mask 59 as illustrated in FIG. 20. The mask 59 is accordingly generated with a mask region corresponding to the concentrated high brightness region.

Figure 21:
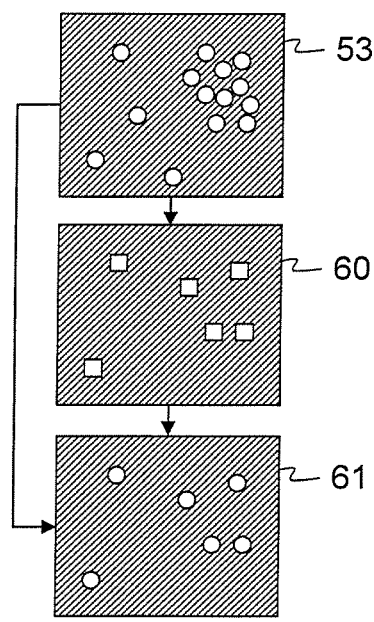
FIG. 21 is a diagram to explain the image processing in the second exemplary embodiment.

At the next step 518, the CPU 21 inputs the high brightness region extraction image 53 to the enlargement/shrinking circuit 24. The enlargement/shrinking circuit 24 first shrinks the high brightness region extraction image 53 according to a thinning ratio, then enlarges back to the original size, and outputs a part-processed image 60 as illustrated in FIG. 21.

At the next step 520, the CPU 21 inputs the high brightness region extraction image 53 and the part-processed image 60 to the mask circuit 26. The mask circuit 26 outputs an overall thinned image 61 as illustrated in FIG. 21 by extracting a common region between the part-processed image 60 and the high brightness region extraction image 53.

Figure 22:
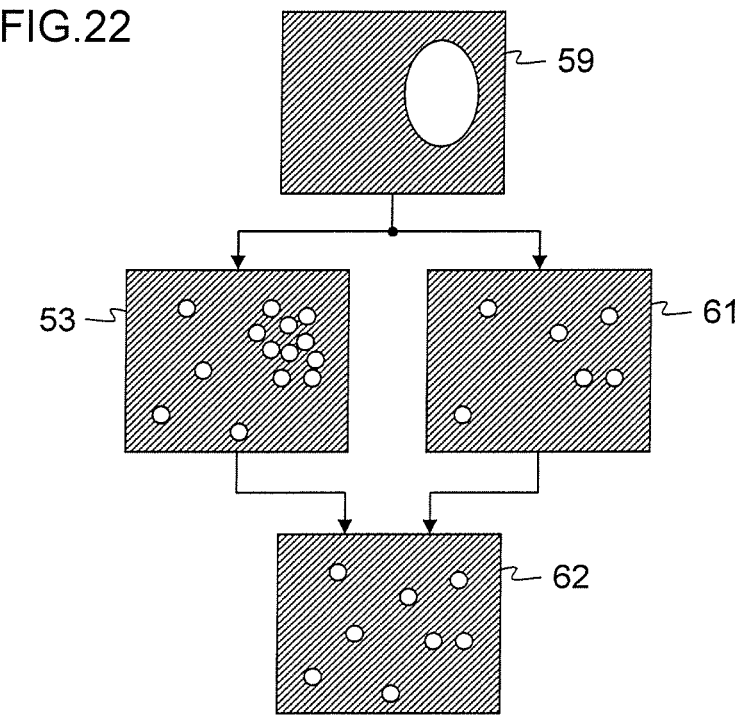
FIG. 22 is a diagram to explain the image processing in the second exemplary embodiment.

At the next step 522, the CPU 21 inputs the mask 59, the high brightness region extraction image 53, and the overall thinned image 61 to the α blend circuit 30. The α blend circuit 30, as illustrated in FIG. 22, employs the overall thinned image 61 in the mask region of the mask 59, employs the high brightness region extraction image 53 in the regions other than the mask region, and synthesizes together the high brightness region extraction image 53 and the overall thinned image 61. The α blend circuit 30 outputs the image synthesized by applying the mask 59 as a mask applied image 62, and processing then returns to the image processing illustrated in FIG. 18.

Note that the processing of steps 502 to 516 described above is processing in the mask generation section 232 of the functional block diagram illustrated in FIG. 5, and the processing of steps 518 to 522 described above is processing in the mask application section 233 of the functional block diagram illustrated in FIG. 5.

As explained above, according to the imaging apparatus according to the second exemplary embodiment, a mask is generated with a mask region corresponding to a concentrated high brightness region by simple processing that is a combination of blur processing and binarization processing. Then by applying this mask to the high brightness region extraction image and an image that is an overall thinned image of the high brightness region extraction image, bright lines are generated after the concentrated high brightness regions has been thinned, thereby enabling the suppression of generation of unsightly bright lines by excessive addition of bright lines. This accordingly enables application of cross filter processing to raise image quality by simple processing that does not entail complicated processing such as processing to determine which high brightness regions to add bright lines to.

Note that in the second exemplary embodiment, a mask is generated with a region corresponding to the concentrated high brightness region, however configuration may be made such that the mask region of the mask includes a region corresponding to a large surface area high brightness region as explained in the first exemplary embodiment. Thus a mask generated in the second exemplary embodiment may be employed to eliminate large surface area high brightness regions such as in the first exemplary embodiment.

Moreover, although explanation has been in the second exemplary embodiment of a case in which an N×N linear smoothing filter is applied once when performing blur processing to generate a mask, there is no limitation thereto. As explained with reference to the first exemplary embodiment, a blur processing target image may be shrunk by $(n-1)/(N-1)$, and an n×n $(n<N)$ linear smoothing filter applied once. An n×n linear smoothing filter may also be applied k times (wherein $k=(N-1)/(n-1)$).

Moreover, configuration may be made to utilize the mask generated in the second exemplary embodiment, so as to generate bright lines that are shorter in length for the high brightness regions contained in the mask region than bright lines for the high brightness region in regions other than the mask region.

Third Exemplary Embodiment

Explanation next follows regarding a third exemplary embodiment. Note that since a hardware configuration of an imaging apparatus 10 according to the third exemplary embodiment is similar to the hardware configuration of the imaging apparatus 10 according to the first exemplary embodiment as illustrated in FIG. 1, further explanation will be omitted.

Figure 23:
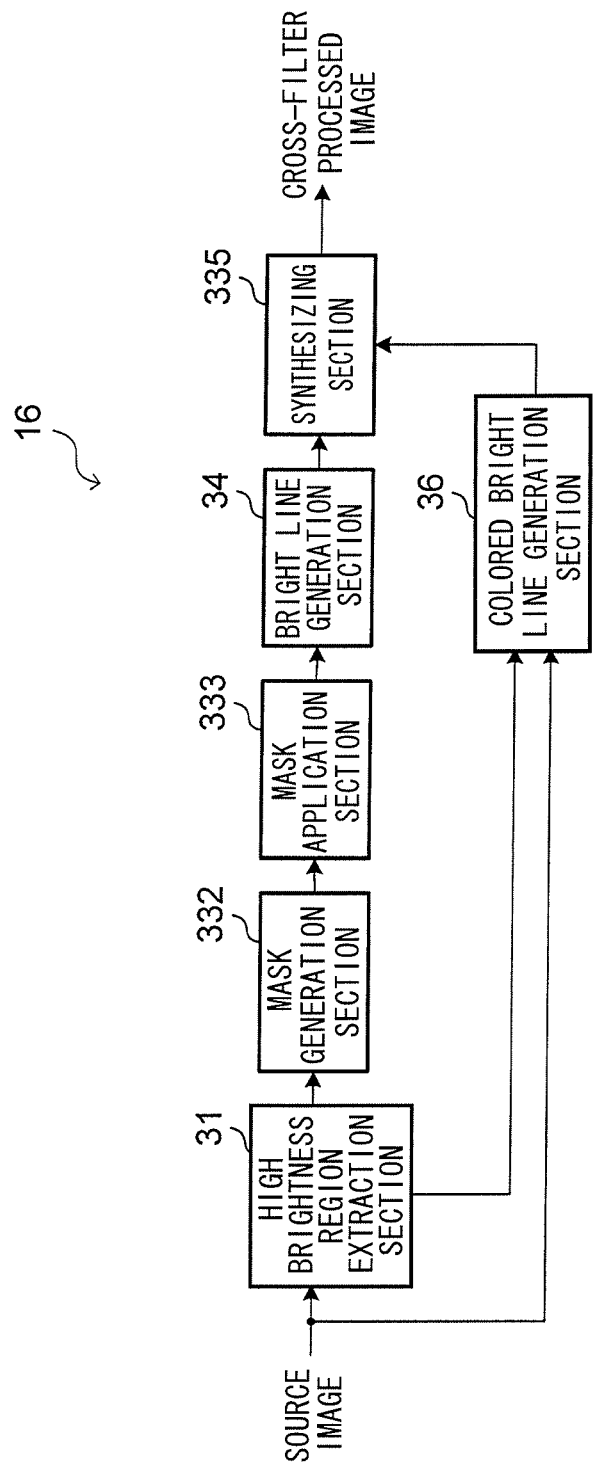
FIG. 23 is a block diagram illustrating an example of a functional configuration of an image processing section according to a third exemplary embodiment.

FIG. 23 illustrates an example of a functional configuration of an image processing section 16 according to a third exemplary embodiment. Note that the same reference numerals are allocated to functional sections that are similar to those of the image processing section 16 of the first exemplary embodiment, and further explanation is omitted thereof.

The image processing section 16 includes a high brightness region extraction section 31, a mask generation section 332, a mask application section 333, a bright line generation section 34, a colored bright line generation section 36 and a synthesizing section 335. Each of the functional sections is implemented by one circuit or by a combination of plural of the circuits illustrated in FIG. 1. For example, the colored bright line generation section 36 is implemented the blur circuit 23, the enlargement/shrinking circuit 24, the rotation circuit 25, and the pixel extraction circuit 29.

The mask generation section 332 performs processing that is a combination of blur processing and binarization processing on the high brightness region extraction image, and generates a first mask that has a mask region corresponding to a large surface area high brightness region. The mask generation section 332 also performs processing that is a combination of blur processing and binarization processing on the high brightness region extraction image, and generates a second mask with a mask region corresponding to a concentrated high brightness region.

Explanation follows regarding a specific generation method of the first mask. Explanation has been given in the mask generation section 32 of the first exemplary embodiment of a case, as illustrated in FIG. 12, in which the processing that is a combination of blur processing and binarization processing (corresponding to the location surrounded by the intermittent line in FIG. 12) is performed twice, and a mask generated. In the mask generation section 332 of the third exemplary embodiment, explanation follows regarding a case in which processing that is a combination of blur processing and binarization processing is performed once and the first mask generated. In order to simplify explanation, explanation follows regarding generation of a mask for a high brightness region with diameter R pixels in which the brightness values of the pixels contained in the high brightness region are all the same as each other. Consideration is also given to a case in which a high brightness threshold value YH is employed as a threshold value during high brightness region extraction.

Figure 24:
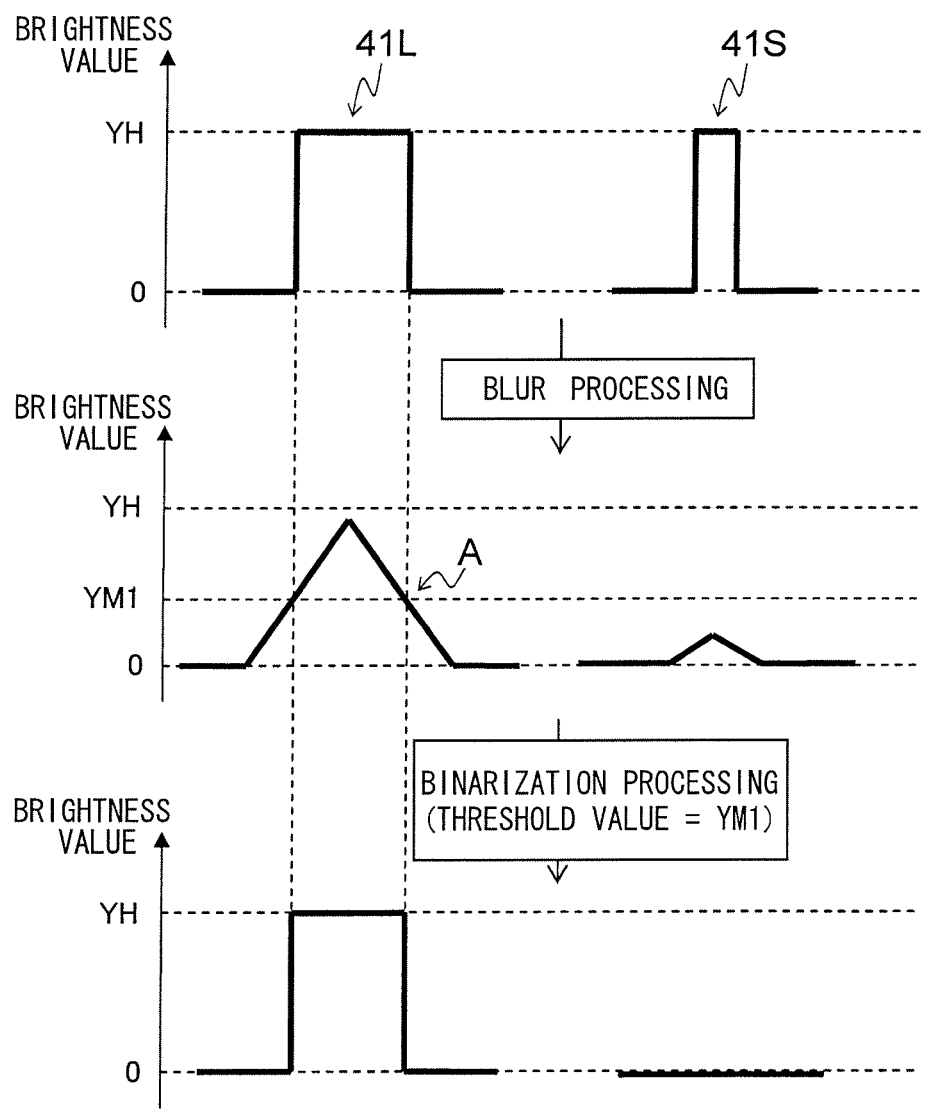
FIG. 24 is a schematic diagram to explain first mask generation in the third exemplary embodiment.

FIG. 24 illustrates brightness values for each pixel position in a radial direction of the high brightness region described above. A large surface area high brightness region 41L that should be eliminated and a high brightness region 41S that should not be eliminated are illustrated in FIG. 24. When a linear filter has been applied to the high brightness region and blur processing performed, as illustrated at A in FIG. 24, the brightness values of the pixels at the outer peripheral portion of the high brightness region 41L prior to filter application become intermediate brightness values YM1 between 0 and YH.

A brightness value after applying a filter of pixels at the outer peripheral portion of a high brightness region 41L prior to filter application is determined as a threshold value YM1 for a case of a filter size that has been set according to a specific size of a large surface area high brightness region, and a high brightness region of a specific size to which blur processing has been applied an appropriate number of times for the filter. A filter size and an appropriate number of filter application times is determined such that the threshold value YM1 is larger than a maximum brightness value after the performing blur processing described above on a high brightness region that is smaller than the specific size. This thereby enables a mask region to be extracted of a region that is substantially the same as the high brightness region 41L prior to filter application to be extracted by binarization with YM1 as the threshold value. For the high brightness region 41S, since the brightness values after filter application are smaller than YM1, the high brightness region 41S is eliminated by binarization with YM1 as the threshold value.

Explanation next follows regarding a specific generation method of the second mask. Explanation has been given of a case in which, in the mask generation section 232 of the second exemplary embodiment, as illustrated in FIG. 20, a mask is generated by performing the processing that is a combination of blur processing and binarization processing (corresponding to the location surrounded by the intermittent line in FIG. 20) 3 times. Explanation follows regarding a cases in which the second mask is generated by performing processing that is a combination of blur processing and binarization processing in the mask generation section 332 of the third exemplary embodiment a single time.

Figure 25:
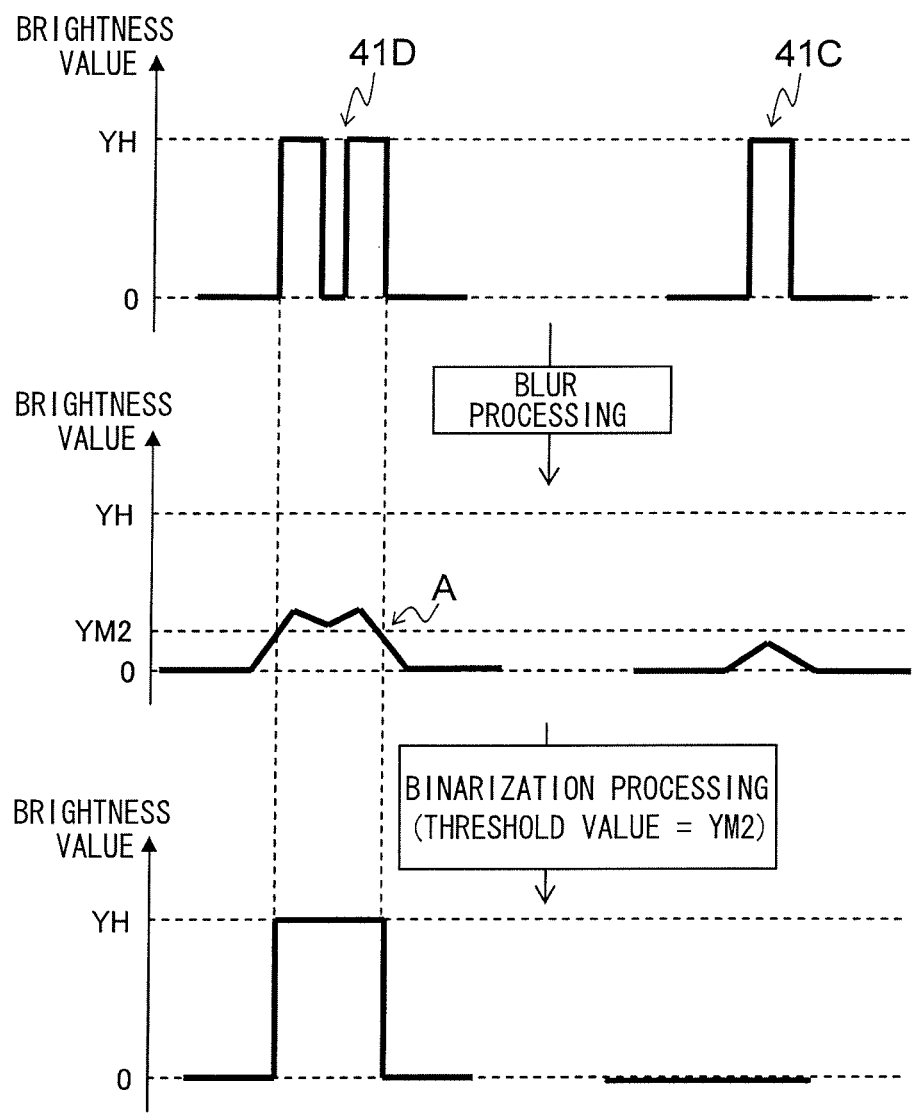
FIG. 25 is a schematic diagram to explain second mask generation in the third exemplary embodiment.

FIG. 25 represents brightness values for each of the pixel positions in a radial direction of a high brightness region. A concentrated high brightness region 41D and a non-concentration high brightness region 41C are illustrated in FIG. 25. The concentrated high brightness region 41D is a region in which plural high brightness regions are concentrated together at a specific separation or closer, and the non-concentration high brightness region 41C is a high brightness region in which there are no other high brightness regions present within positions separated therefrom by the specific separation. When blur processing is performed by applying a linear filter to the high brightness region, the brightness values of the concentrated high brightness region 41D reduce by a smaller amount than the brightness values or the non-concentration high brightness region 41C. As illustrated at A in FIG. 25, the brightness values of the pixels of the outer peripheral portion of the concentrated high brightness region 41D prior to filter application are intermediate brightness values YM2 between 0 and YH.

When blur processing is performed at a pre-set filter size and a pre-set number of filter application times on the concentrated high brightness region, the brightness values after filter application of the pixels of the prior to filter application outer peripheral portions of the concentrated high brightness region 41D are determined with the threshold value YM2. The filter size and the number of filter application times is determined such that the threshold value YM2 is greater than the maximum brightness value after performing the blur processing described above on the non-concentration high brightness region 41C. This thereby enables a region substantially the same as the concentrated high brightness region prior to filter application to be extracted and the mask region by binarization with YM2 as the threshold value. The non-concentration high brightness region 41C is eliminated by binarization with YM2 as the threshold value since the brightness values after filter application are smaller than the YM2.

The blur processing for generating the first mask and the second mask may, similarly to in the mask generation section 32 of the first exemplary embodiment, for example be performed by a single application of an N×N linear smoothing filter. Moreover, configuration may be made such that the blur processing target image is shrunk by (n−1)/N−1), and an n×n (n<N) linear smoothing filter applied a single time. An n×n linear smoothing filter may also be applied k times (wherein k=(N−1)/(n−1)).

The mask application section 333 applies the first mask generated by the mask generation section 332 similarly to in the first exemplary embodiment so as to eliminate the large surface area high brightness region, and applies the second mask similarly to in the second exemplary embodiment to generate a mask applied image that has a thinned concentrated high brightness region.

Figure 26:
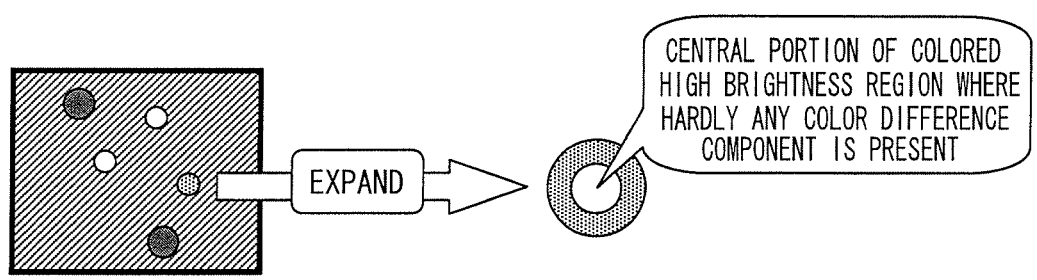
FIG. 26 is a schematic diagram to explain processing of a colored bright line generation section.
Figure 27:
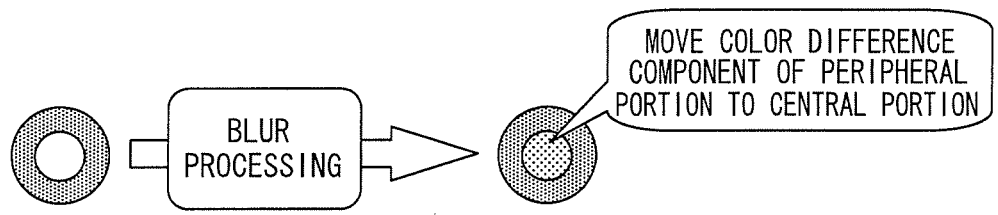
FIG. 27 is a schematic diagram to explain processing of a colored bright line generation section.

By processing similar to that of the bright line generation section 34, the colored bright line generation section 36 generates a colored bright line of the same color as a light source from regions corresponding to the high brightness region (colored high brightness region) in the CbCr image expressing the color component (the CbCr component) of the YCbCr image that is the source image. However, as illustrated in FIG. 26, even for a colored high brightness region there is hardly any color difference component present in a central portion of a high brightness region, and so sometimes a colored bright line does not result even when a bright line is generated from a CbCr image. The colored bright line generation section 36 accordingly, as illustrated in FIG. 27, applies blur processing in advance to the CbCr image, moves the color difference component of the peripheral portion of the high brightness region towards the central portion, and then generates a bright line. This enables sufficient color to be applied to the bright line.

Moreover, when synthesizing a colored bright line onto the source image, when a color difference component (CbCr component) is imparted to brightness saturated pixels whose brightness value is saturated, sometimes unnatural coloring results when the synthesized image that is a YCbCr image is converted into an sRGB image for screen display. This arises because YCbCr space is wider than sRGB space, and so there are cases when brightness is saturated and there is color difference component that the YCbCr space projects out from the sRGB space.

In order to avoid this problem, after the colored bright line has been synthesized onto the source image the synthesizing section 335 extracts the brightness saturated pixels whose brightness is saturated from the Y image, and makes the brightness saturated pixels colorless (a color difference component of 0).

Figure 28:
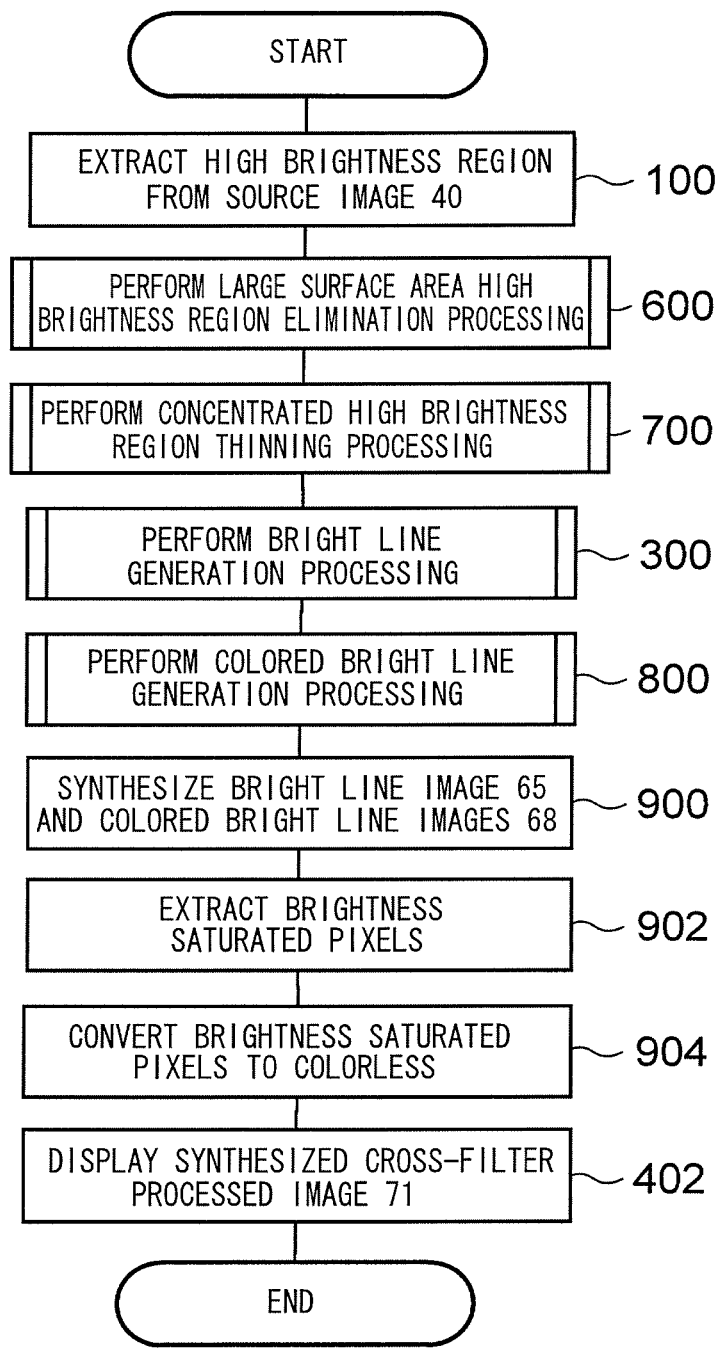
FIG. 28 is a flow chart illustrating image processing in a third exemplary embodiment.

Explanation next follows regarding operation of the imaging apparatus 10 according to the third exemplary embodiment. In the third exemplary embodiment, the image processing illustrated in FIG. 28 is executed by the image processing section 16. Note that processing similar to the processing of the first and second exemplary embodiments is allocated the same reference numerals and further explanation is omitted thereof.

Figure 29:
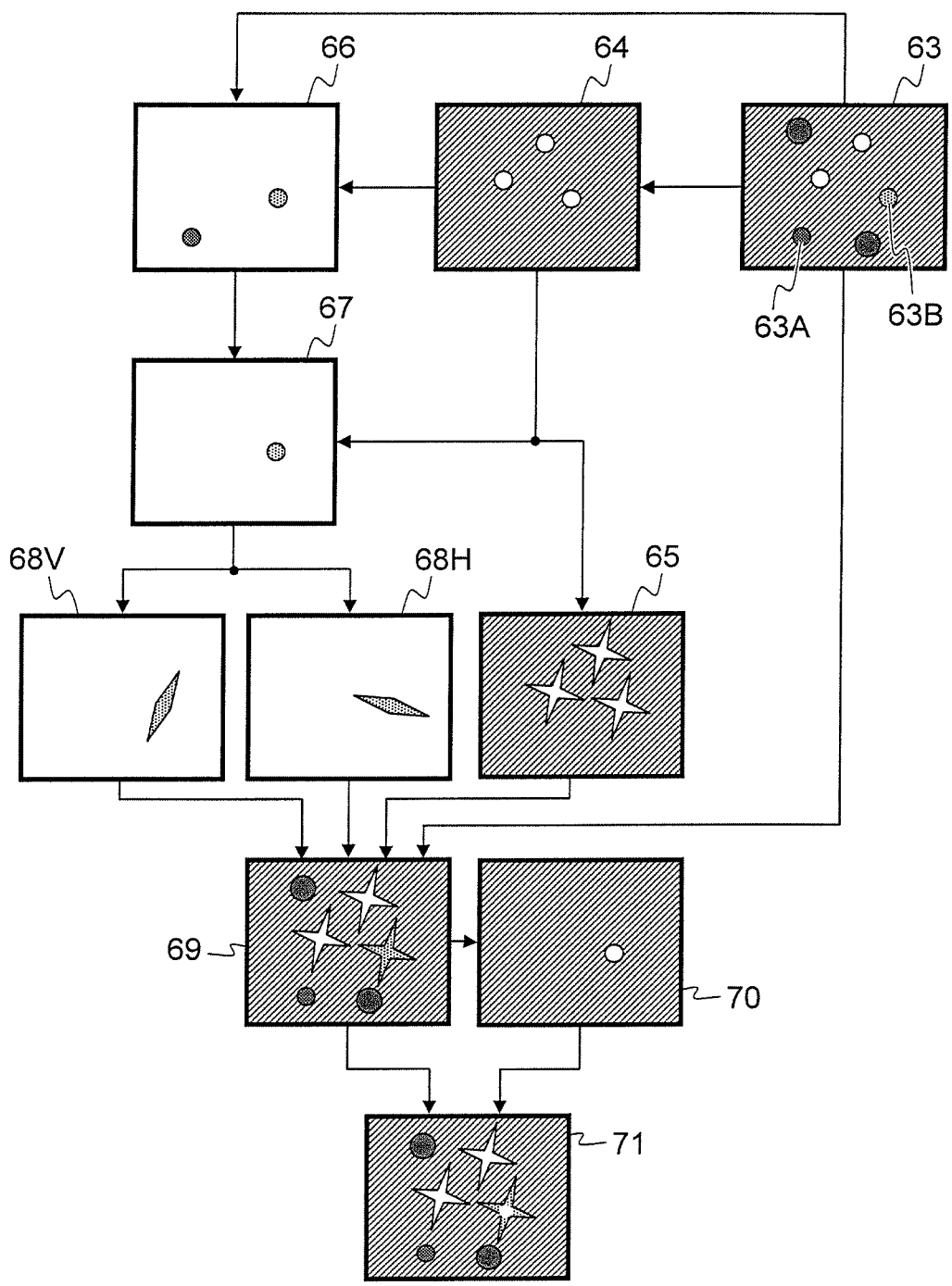
FIG. 29 is a diagram to explain image processing in a third exemplary embodiment.

At step 100 of the image processing illustrated in FIG. 28, the CPU 21 inputs to the pixel extraction circuit 29 a Y image expressing the Y component of the YCbCr image that is the source image 63 illustrated in FIG. 29 stored in the RAM 22. The pixel extraction circuit 29 extracts high brightness regions from the Y image, and outputs a high brightness region extraction image 64 as illustrated in FIG. 29. Note that the source image 63 in FIG. 29 has a region that has a color component but is not a high brightness region 63A and a colored high brightness region 63B.

At the next step 600, large surface area high brightness region elimination processing is executed. Explanation follows regarding points of difference in the large surface area high brightness region elimination processing executed here from the large surface area high brightness region elimination processing executed in the first exemplary embodiment (see FIG. 14).

In the large surface area high brightness region elimination processing in the third exemplary embodiment, steps 204 and 206 are omitted out of the processing of steps 202 to 214 of FIG. 14. An intermediate threshold value YM1 is employed as the threshold value for binarization processing at step 212.

Note that the processing of step 202 and steps 208 to 212 is processing in the mask generation section 332 of the functional block diagram illustrated in FIG. 23, the processing of step 214 is processing in the mask application section 333 of the functional block diagram illustrated in FIG. 23.

Next, at step 700 of the image processing illustrated in FIG. 28, concentrated high brightness region thinning processing is executed. Explanation follows regarding points of difference of the concentrated high brightness region thinning processing executed here to the concentrated high brightness region thinning processing in the second exemplary embodiment (see FIG. 19).

In the concentrated high brightness region thinning processing of the third exemplary embodiment, the steps 504 to 510 are omitted out of steps 502 to 522 of FIG. 19. An intermediate threshold value YM2 is employed as the threshold value in binarization processing of step 516.

Note that processing of step 502 and steps 512 to 516 is processing in the mask generation section 332 of the functional block diagram illustrated in FIG. 23, and the processing of steps 518 to 522 is processing of mask application section 333 of the functional block diagram illustrated in FIG. 23.

Next, at step 300 of the image processing illustrated in FIG. 28, the bright line generation processing illustrated in FIG. 15 is executed, and a bright line image 65 as illustrated in FIG. 29 is generated. Note that 65 in FIG. 29 illustrates a state combining bright line images generated in two directions.

Colored bright line generation processing is executed at the next step 800. Explanation follows regarding colored bright line generation processing, with reference to FIG. 30.

Figure 30:
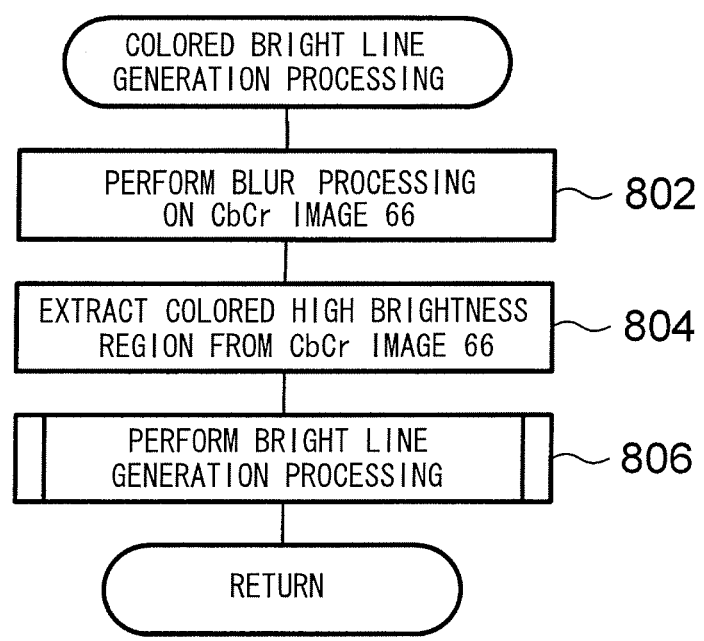
FIG. 30 is a flow chart illustrating colored bright line generation processing.

At step 802 of the colored bright line generation processing illustrated in FIG. 30, the CPU 21 inputs the blur circuit 23 with a CbCr image 66 as illustrated in FIG. 29 expressing the color difference component (CbCr component) of the YCbCr image that is the source image. The blur circuit 23 performs blur processing on the CbCr image 66. Color difference components of the peripheral portion of the high brightness region are thereby moved towards the central portion.

At the next step 804, the CPU 21 inputs the blur-processed CbCr image 66 to the pixel extraction circuit 29. The pixel extraction circuit 29 extracts a colored high brightness region that is a region corresponding to a high brightness region from the CbCr image 66, based on the high brightness region extraction image 64. The pixel extraction circuit 29 outputs a part-processed image 67 as illustrated in FIG. 29 in which a concentrated high brightness region has been extracted.

At the next step 806, colored bright line images 68H, 68V are generated by executing the bright line generation processing as illustrated in FIG. 15 on the part-processed image 67, and then processing returns to the image processing illustrated in FIG. 28.

Note that the colored bright line generation processing is processing in the colored bright line generation section 36 of the functional block diagram illustrated in FIG. 23.

Next, at step 900 of the image processing illustrated in FIG. 28, the CPU 21 inputs the weighting application computation circuit 28 with a bright line image 65, the colored bright line images 68H, 68V and the source image 63. The weighting application computation circuit 28 synthesizes the bright line image 65 and the colored bright line images 68H, 68V onto the source image 63, and outputs a part-processed image 69 as illustrated in FIG. 29.

Next, at step 902, the CPU 21 inputs the part-processed image 69 to the pixel extraction circuit 29. The pixel extraction circuit 29 extracts brightness saturated pixels whose brightness values are saturated from the Y image expressing the Y component of the part-processed image 69 that is the YCbCr image, and outputs a brightness saturated image 70 as illustrated in FIG. 29.

Next at step 904, the CPU 21 inputs the part-processed image 69 and the brightness saturated image 70 to the mask circuit 26. Based on the brightness saturated image 70, the mask circuit 26 generates and outputs a cross-filter processed image 71 in which brightness saturated pixels in the part-processed image 69 have been made colorless (the color component made 0).

At the next step 402, the CPU 21 stores the cross-filter processed image 71 output from the mask circuit 26 in the RAM 22, controls to display the cross-filter processed image 71 on the display section 14, and ends the image processing.

Note that the processing of steps 900 to 904 and step 402 is processing in the synthesizing section 335 of the functional block diagram of FIG. 23.

As explained above, according to the imaging apparatus according to the third exemplary embodiment, since large surface area high brightness regions are eliminated and concentrated high brightness region are thinned, unsightliness is suppressed even further. Moreover, simple processing, that is performing processing that is a combination of blur processing and binarization processing a single time, enables the generation of a first mask for performing large surface area high brightness region elimination, and a second mask for performing concentrated high brightness region thinning. This thereby enables cross filter processing with raised image quality to be performed with simple processing. Moreover, by adding colored bright lines, and making brightness saturated pixels colorless, cross filter processing is enables that further raises image quality.

Moreover, in the first to the third exemplary embodiments, it is possible to implement the image processing section 16 with an ordinary image processing processor provided for example with a blur circuit and a binarization circuit, enabling higher speed processing to be implemented with hardware without greatly increasing the circuit scale by hardware expansion.

Fourth Exemplary Embodiment

Figure 31:
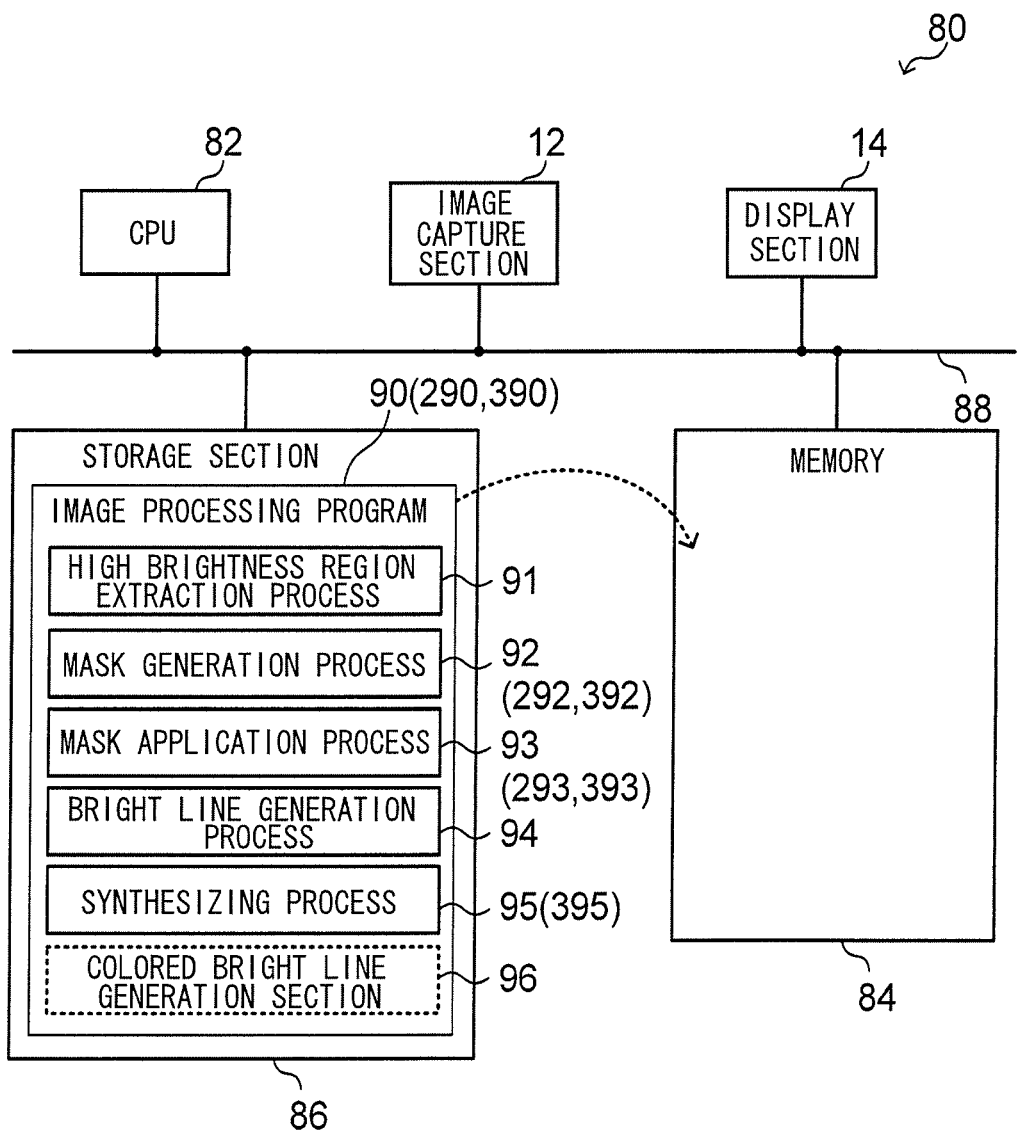
FIG. 31 is a schematic block diagram illustrating an example of a computer that functions as an image processing section of an imaging apparatus according to a fourth exemplary embodiment.

Explanation follows regarding a fourth exemplary embodiment. Explanation has been given in the first to the third exemplary embodiments of cases in which the image processing section 16 is an image processing processor. However an image processing section 16 in an imaging apparatus 10 according to the fourth exemplary embodiment may for example be implemented by a computer 80 as illustrated in FIG. 31. The computer 80 includes a CPU 82, a memory 84, and a non-volatile storage section 86. The CPU 82, the memory 84 and the storage section 86 are connected to each other through a bus 88. An image capture section 12 and a display section 14 are connected to the computer 80.

The storage section 86 may be implemented for example by a Hard Disk Drive (HDD) or flash memory. An image processing program 90 to cause the computer 80 to function as the image processing section 16 is stored on the storage section 86 serving as a recording medium. The CPU 82 reads the image processing program 90 from the storage section 86, expands the image processing program 90 into the memory 84, and sequentially executes the processes of the image processing program 90.

The image processing program 90 includes a high brightness region extraction process 91, a mask generation process 92, a mask application process 93, a bright line generation process 94, and a synthesizing process 95.

The CPU 82 operates as the high brightness region extraction section 31 illustrated in FIG. 5 by executing the high brightness region extraction process 91. The CPU 82 operates as the mask generation section 32 illustrated in FIG. 5 by executing the mask generation process 92. The CPU 82 operates as the mask application section 33 illustrated in FIG. 5 by executing the mask application process 93. The CPU 82 operates as the bright line generation section 34 illustrated in FIG. 5 by executing the bright line generation process 94. The CPU 82 operates as the synthesizing section 35 illustrated in FIG. 5 by executing the synthesizing process 95. Thus the computer 80 executing the image processing program 90 thereby functions as the image processing section 16 similarly to in the first exemplary embodiment.

Moreover, an image processing program 290 may be stored in the storage section 86 to cause the computer 80 to function as the image processing section 16 of the second exemplary embodiment. In such cases, the CPU 82 reads the image processing program 290 from the storage section 86, expands the image processing program 290 into the memory 84, and sequentially executes the processes of the image processing program 290.

The image processing program 290 includes a high brightness region extraction process 91, a mask generation process 292, a mask application process 293, a bright line generation process 94 and a synthesizing process 95.

The CPU 82 operates as the mask generation section 232 illustrated in FIG. 5 by executing the mask generation process 292. The CPU 82 operates as the mask application section 233 illustrated in FIG. 5 by executing the mask application process 293. The other processes are similar to those of the image processing program 90. Thus the computer 80 executing the image processing program 290 thereby functions as the image processing section 16 similar to in the second exemplary embodiment.

Moreover, an image processing program 390 may be stored in the storage section 86 to cause the computer 80 to function as the image processing section 16 of the third exemplary embodiment. In such cases, the CPU 82 reads the image processing program 390 from the storage section 86, expands the image processing program 390 into the memory 84, and sequentially executes the processes of the image processing program 390.

The image processing program 390 includes a high brightness region extraction process 91, a mask generation process 392, a mask application process 393, a bright line generation process 94, a colored bright line generation section 96 and a synthesizing process 395.

The CPU 82 operates as the mask generation section 332 illustrated in FIG. 23 by executing the mask generation process 392. The CPU 82 operates as the mask application section 333 illustrated in FIG. 23 by executing the mask application process 393. The CPU 82 operates as the colored bright line generation section 36 illustrated in FIG. 23 by executing the colored bright line generation section 96. The CPU 82 operates as the synthesizing section 335 illustrated in FIG. 23 by executing the synthesizing process 395. The other processes are similar to those of the image processing program 90. The computer 80 executing the image processing program 390 accordingly functions as the image processing section 16 similar to in the third exemplary embodiment.

According to the imaging apparatus of the fourth exemplary embodiment, similar advantageous effects to those of the imaging apparatuses of the first to the third exemplary embodiment may be implemented by software as explained above.

Note that explanation has been given of modes in which the image processing programs 90, 290, 390 serving as examples of an image processing program of technology disclosed herein are pre-stored (pre-installed) in the storage section 86. However, an image processing program of technology disclosed herein may be provided in a format recorded on a recording medium such as a CD-ROM or DVD-ROM An aspect of technology disclosed herein exhibits the advantageous effect of enabling cross filter processing that raises image quality to be performed with easy processing.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image processing apparatus comprising:
    an extraction section that extracts a first high brightness region from a source image, the first high brightness region having a brightness at a first threshold value or greater;
    a mask generation section that performs blur processing and binarization processing on the first high brightness region and generates a mask containing the first high brightness region;
    a mask application section that, based on the mask, performs at least one of elimination processing or thinning processing on the first high brightness region;
    a bright line generation section that generates a bright line based on a second high brightness region contained in output of the mask application section; and
    a synthesizing section that synthesizes the bright line onto the source image.

2. The image processing apparatus of claim 1, wherein the mask generation section generates the mask by performing the blur processing, including linear filter processing, on the first high brightness region, and by performing the binarization processing on an image after the blur processing based on a second threshold value smaller than the first threshold value.

3. The image processing apparatus of claim 1, wherein the mask generation section generates the mask by:
    performing first blur processing, that includes linear filter processing that maintains the maximum brightness value within the first high brightness region, in a case in which the first high brightness region is larger than a specified size, and that does not maintain the maximum brightness value within the first high brightness region in a case in which the first high brightness region is smaller than the specified size;
    performing first binarization processing, on an image resulting from the first blur processing, based on the first threshold value;
    performing the first blur processing on a high brightness region resulting from the first binarization processing; and
    performing the binarization processing on the image resulting from the first blur processing on the high brightness region resulting from the first binarization processing.

4. The image processing apparatus of claim 1, wherein the mask generation section generates the mask by performing the blur processing, including linear filter processing, on the first high brightness region, and by performing the binarization processing on an image resulting from the blur processing with a brightness value of an outer peripheral portion of a region containing a plurality of the first high brightness regions employed as a second threshold value.

5. The image processing apparatus of claim 1 wherein the mask generation section generates the mask by:
    performing first blur processing that includes linear filter processing on the first high brightness region such that a plurality of the first high brightness regions, separated by a specified separation or less, become a single region;

performing first binarization processing on an image resulting from the first blur processing;

performing second blur processing on a high brightness region extracted by the first binarization processing;

performing second binarization processing on an image resulting from the second blur processing based on the first threshold value;

performing third blur processing on a high brightness region extracted by the second binarization processing; and performing third binarization processing on an image resulting from the third blur processing.

6. The image processing apparatus of claim 1, further comprising:
   a colored bright line generation section that generates a colored bright line with a color difference component, based on a region of the source image in which a color difference component is present corresponding to the first high brightness region;
   wherein the synthesizing section synthesizes the colored bright line to the source image.

7. The image processing apparatus of claim 1, wherein the mask generation section contains a blur circuit that performs the blur processing and a binarization circuit that performs the binarization processing.

8. An image processing method executed by a computer, the method comprising:
   (a) extracting a first high brightness region from a source image, the first high brightness region having a brightness at a first threshold value or greater;
   (b) performing blur processing and binarization processing on the first high brightness region and generating a mask containing the first high brightness region;
   (c) based on the mask, generating a bright line based on a second high brightness region contained in output from performing elimination processing, thinning processing, or both on the first high brightness region; and
   (d) synthesizing the bright line onto the source image.

9. The image processing method of claim 8, the method comprising, in (b), generating the mask by performing the blur processing, including linear filter processing, on the first high brightness region, and by performing the binarization processing on an image after the blur processing based on a second threshold value smaller than the first threshold value.

10. The image processing method of claim 8, the method comprising, in (b), generating the mask by:
    performing first blur processing that includes linear filter processing that maintains the maximum brightness value within the first high brightness region in a case in which the first high brightness region is larger than a specified size, and that does not maintain the maximum brightness value within the first high brightness region in a case in which the first high brightness region is smaller than the specified size;
    performing first binarization processing, on an image resulting from the first blur processing, based on the first threshold value;
    performing the first blur processing on a high brightness region resulting from the first binarization processing; and
    performing the binarization processing on the image resulting from the first blur processing on the high brightness region resulting from the first binarization processing.

11. The image processing method of claim 8, the method comprising, in (b), generating the mask by:
    performing the blur processing, including linear filter processing, on the first high brightness region; and
    performing the binarization processing on an image resulting from the blur processing with a brightness value of an outer peripheral portion of a region containing a plurality of the first high brightness regions employed as a second threshold value.

12. The image processing method of claim 8, the method comprising, in (b), generating the mask by:
    performing first blur processing that includes linear filter processing on the first high brightness region such that a plurality of the first high brightness regions, separated by a specified separation or less, become a single region;
    performing first binarization processing on an image resulting from the first blur processing;
    performing second blur processing on a high brightness region extracted by the first binarization processing;
    performing second binarization processing on an image resulting from the second blur processing based on the first threshold value;
    performing third blur processing on a high brightness region extracted by the second binarization processing; and
    performing third binarization processing on an image resulting from the third blur processing.

13. The image processing method of claim 8, the method comprising: (e) generating a colored bright line with a color difference component, based on a region of the source image in which a color difference component is present corresponding to the first high brightness region; and, in (d), synthesizing the colored bright line to the source image.

14. The image processing method of claim 8 the method comprising, in (b), performing the blur processing with a blur circuit and performing the binarization processing with a binarization circuit.

15. A recording medium that stores an image processing program that causes a computer to execute processing, the processing comprising:
    (a) extracting a first high brightness region from a source image, the first high brightness region having a brightness at a first threshold value or greater;
    (b) performing blur processing and binarization processing on the first high brightness region and generating a mask containing the first high brightness region;
    (c) based on the mask, generating a bright line based on a second high brightness region contained in output from performing elimination processing, thinning processing, or both on the first high brightness region; and
    (d) synthesizing the bright line onto the source image.

16. The recording medium that stores the image processing program of claim 15, the processing comprising, in (b), generating the mask by performing the blur processing, including linear filter processing, on the first high brightness region, and by performing the binarization processing on an image after the blur processing based on a second threshold value smaller than the first threshold value.

17. The recording medium that stores the image processing program of claim 15, the processing comprising, in (b), generating the mask by:
    performing first blur processing, that includes linear filter processing that maintains the maximum brightness value within the first high brightness region, in a case in which the first high brightness region is larger than a specified size, and that does not maintain the maximum brightness value within the first high brightness region in a case in which the first high brightness region is smaller than the specified size;

performing first binarization processing, on an image resulting from the first blur processing, based on the first threshold value;

performing the first blur processing on a high brightness region resulting from the first binarization processing; and performing the binarization processing on the image resulting from the first blur processing on the high brightness region resulting from the first binarization processing.

18. The recording medium that stores the image processing program of claim 15, the processing comprising, in (b), generating the mask by:

performing the blur processing, including linear filter processing, on the first high brightness region; and performing the binarization processing on an image resulting from the blur processing with a brightness value of an outer peripheral portion of a region containing a plurality of the first high brightness regions employed as a second threshold value.

19. The recording medium that stores the image processing program of claim 15, the processing comprising, in (b), generating the mask by:

performing first blur processing that includes linear filter processing on the first high brightness region such that a plurality of the first high brightness regions, separated by a specified separation or less, become a single region;

performing first binarization processing on an image resulting from the first blur processing;

performing second blur processing on a high brightness region extracted by the first binarization processing;

performing second binarization processing on an image resulting from the second blur processing based on the first threshold value;

performing third blur processing on a high brightness region extracted by the second binarization processing; and performing third binarization processing on an image resulting from the third blur processing.

20. The recording medium that stores the image processing program of claim 15, the processing comprising: (e) generating a colored bright line with a color difference component, based on a region of the source image in which a color difference component is present corresponding to the first high brightness region; and, in (d), synthesizing the colored bright line to the source image.

* * * * *